United States Patent
Naumann et al.

(10) Patent No.: US 10,904,291 B1
(45) Date of Patent: Jan. 26, 2021

(54) LOW-OVERHEAD SOFTWARE TRANSFORMATION TO ENFORCE INFORMATION SECURITY POLICIES

(71) Applicant: HRL Laboratories, LLC, Malibu, CA (US)

(72) Inventors: David Naumann, Hoboken, NJ (US); Andrey Chudnov, New York, NY (US); Aleksey Nogin, Fresno, CA (US); Pape Sylla, Calabsas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 280 days.

(21) Appl. No.: 15/909,998

(22) Filed: Mar. 1, 2018

Related U.S. Application Data

(60) Provisional application No. 62/500,827, filed on May 3, 2017.

(51) Int. Cl.
  *H04L 29/06* (2006.01)
  *G06F 8/40* (2018.01)
  *G06F 11/36* (2006.01)
  *G06F 21/12* (2013.01)

(52) U.S. Cl.
  CPC .............. *H04L 63/20* (2013.01); *G06F 8/40* (2013.01); *G06F 11/3612* (2013.01); *G06F 21/125* (2013.01)

(58) Field of Classification Search
  CPC .... H04L 63/20; G06F 11/3612; G06F 21/125; G06F 8/40
  See application file for complete search history.

(56) References Cited

U.S. PATENT DOCUMENTS

| | | | | |
|---|---|---|---|---|
| 5,983,348 A | * | 11/1999 | Ji | G06F 21/51 714/38.1 |
| 8,296,848 B1 | * | 10/2012 | Griffin | G06F 21/577 715/201 |
| 8,413,239 B2 | * | 4/2013 | Sutton | H04L 63/1483 726/23 |
| 9,043,916 B1 | * | 5/2015 | Burns | G06F 21/54 726/24 |
| 9,384,148 B2 | * | 7/2016 | Muttik | G06F 12/1441 |
| 9,727,729 B2 | * | 8/2017 | Gupta | G06F 21/566 |

(Continued)

OTHER PUBLICATIONS

Aslan Askarov, Stephen Chong, and Heiko Mantel. Hybrid monitors for concurrent noninterference. In Proceedings of be 28th IEEE Computer Security Foundations Symposium, 2015, pp. 137-151.

(Continued)

*Primary Examiner* — Christopher A Revak
(74) *Attorney, Agent, or Firm* — Tope-McKay & Associates

(57) ABSTRACT

Described is a system for enforcing software policies. The system transforms an original software by inserting additional instructions into the original software. The additional instructions have the effect of determining, at run-time, whether proceeding with execution of the original software is in accordance with a predefined policy. Transforming the original software relies on software analysis to determine whether any run-time checks normally inserted into the original software can be safely omitted. The transformed software prevents unauthorized information from passing to the network.

20 Claims, 9 Drawing Sheets

(56) References Cited

U.S. PATENT DOCUMENTS

| | | | | |
|---|---|---|---|---|
| 9,940,475 | B2* | 4/2018 | Gschwind | G06F 21/53 |
| 10,339,322 | B2* | 7/2019 | Kim | G06F 21/577 |
| 10,430,587 | B2* | 10/2019 | Kuan | G06F 16/23 |
| 2006/0230388 | A1* | 10/2006 | Hatlelid | G06F 21/565 |
| | | | | 717/127 |
| 2016/0300056 | A1* | 10/2016 | Tashiro | G06F 21/52 |
| 2017/0063923 | A1* | 3/2017 | Yang | H04L 63/1483 |
| 2017/0249460 | A1* | 8/2017 | Lipton | G06F 21/602 |
| 2018/0226136 | A1* | 8/2018 | Jeansonne | G11C 29/38 |
| 2019/0042750 | A1* | 2/2019 | August | G06F 21/57 |
| 2020/0057849 | A1* | 2/2020 | Lotspeich | G06F 21/563 |

OTHER PUBLICATIONS

Aslan Askarov and Andrew C. Myers. Attacker control and impact for confidentiality and integrity. Logical Methods in Computer Science, vol. 7 (3:17) 2011, pp. 1-33.

Aslan Askarov and Andrei Sabelfeld. Catch me if you can: permissive yet secure error handling. In Proceedings of the 2009 Workshop on Programming Languages and Analysis for Security, (PLAS), pp. 45-57, 2009.

Aslan Askarov and Andrei Sabelfeld. Tight enforcement of information-release policies for dynamic languages. IEEE Computer Security Foundations Symposium, pp. 43-59, 2009.

Thomas Ball. What's in a region? or computing control dependence regions in near-linear time for reducible control flow. LOPLAS, 2(1-4): pp. 1-16, 1993.

Anindya Banerjee and David A. Naumann. Stack-based access control for secure information flow. Journal of Functional Programming, 15(2): pp. 131-177, 2005. Special issue on Language Based Security.

Anindya Banerjee, David A. Naumann, and Stan Rosenberg. Expressive declassification policies and modular static enforcement. In 29th IEEE Symposium on Security and Privacy, pp. 339-353, 2008.

Abhishek Bichhawat, Vineet Rajani, Deepak Garg, and Christian Hammer. Information flow control in webkit's javascript bytecode. In Martin Abadi and Steve Kremer, editors, Proceedings of the Third International Conference on Principles of Security and Trust (POST'14), vol. 8414 of Lecture Notes in Computer Science, pp. 159-178. Springer, 2014.

Franz Baader and Wayne Snyder. Unification theory. In John Alan Robinson and Andrei Voronkov, editors, Handbook of Automated Reasoning (in 2 volumes), pp. 445-532. Elsevier and MIT Press, 2001.

Andrey Chudnov, George Kuan, and David A. Naumann. Information flow monitoring as abstract interpretation for relational logic. In IEEE Computer Security Foundations Symposium, pp. 48-62, 2014.

Andrey Chudnov and David A. Naumann. Information flow monitor inlining. In 2010 23rd IEEE Computer Security Foundations Symposium, 2010, pp. 200-214.

Andrey Chudnov and David A. Naumann. Inlined information flow monitoring for JavaScript. In Proceedings of the 22nd ACM SIGSAC Conference on Computer and Communications Security—CCS'15. Association for Computing Machinery (ACM), 2015, pp. 629-643.

Dorothy E. Denning. A lattice model of secure information flow. Communications of the ACM, 19(5): pp. 236-243, May 1976.

Catalin Hritcu, Michael Greenberg, Ben Karel, Benjamin C. Pierce, and Greg Morrisett. All your IFCException are belong to us. In IEEE Symposium on Security and Privacy, pp. 3-17, 2013.

Daniel Huang and Greg Morrisett. Formalizing the SAFECode type system. In Certified Programs and Proofs—Third International Conference, CPP, vol. 8307 of Lecture Notes in Computer Science, pp. 211-226, 2013.

Chris Lattner and Vikram S. Adve. Automatic pool allocation: improving performance by controlling data structure layout in the heap. In PLDI, pp. 129-142, 2005.

Gurvan Le Guernic, Anindya Banerjee, Thomas Jensen, and David A Schmidt. Automata-based confidentiality monitoring. In Advances in Computer Science-ASIAN 2006. Secure Software and Related Issues, pp. 75-89. Springer, 2006.

Scott Moore and Stephen Chong. Static analysis for efficient hybrid information-flow control. In Proceedings of the 24th IEEE Computer Security Foundations Symposium, pp. 146-160, Piscataway, NJ, USA, Jun. 2011. IEEE Press.

Ricardo Medel, Adriana B. Compagnoni, and Eduardo Bonelli. A typed assembly language for non-interference. In Theoretical Computer Science, 9th Italian Conference, vol. 3701 of Lecture Notes in Computer Science, pp. 360-374. Springer, 2005.

Andrew C.Myers. JFlow: practical mostly-static information flow control. In POPL '99: Proceedings of the 26th ACM SIGPLAN-SIGACT symposium on Principles of programming languages, pp. 228-241. ACM, 1999.

David A. Naumann. Verifying a secure information flow analyzer. In 18th International Conference on Theorem Proving in Higher Order Logics (TPHOLS), vol. 3603, pp. 211-226, 2005.

Keshav Pingali and Gianfranco Bilardi. Optimal control dependence computation and the Roman chariots problem. ACM Trans. Program. Lang. Syst., 19(3): pp. 462-491, 1997.

Alejandro Russo and Andrei Sabelfeld. Dynamic vs. static flow-sensitive security analysis. In Computer Security Foundations Symposium, pp. 186-199. IEEE, 2010.

Vincent Simonet and Inria Rocquencourt. Flow Caml in a nutshell. In Proceedings of the first APPSEM-II workshop, pp. 152-165, 2003.

JosFragoso Santos and Tamara Rezk. An information flow monitor-inlining compiler for securing a core of JavaScript. In ICT Systems Security and Privacy Protection, vol. 428 of Advances in Information and Communication Technology. IFIP, 2014, pp. 279-292.

Andrei Sabelfeld and David Sands. "Declassification: Dimensions and principles," Journal of Computer Security, 2009, pp. 517-548.

Viorica Sofronie-Stokkermans. On unification for bounded distributive lattices. ACM Trans. Comput. Logic, 8(2), Apr. 2007, pp. 1-27.

Peter Thiemann. Towards specializing JavaScript programs. In Lecture Notes in Computer Science, pp. 320-334. Springer, 2015.

Joe Hurd, Aaron Tomb and David Burke, "Visualizing Information Flow through C Programs; Automated Security Analysis Project," Galois Tech Talk, Apr. 27, 2010, pp. 1-25.

* cited by examiner

| Block conditions | Inlining constraints | Block foreword |
|---|---|---|
| $\|preds(b)\| = 0$ | $\forall i \in [i_0..i n].\exists (x = e) \in PI \cdot \|r_i, \textbf{in}\| \in e$ | $\%\|r_0, \textbf{in}\| := $ load $@\|r_0\|$ ... $\%\|r_n, \textbf{in}\| :=$ load $@\|r_n\|; \%\|b\| := $ load $@\|pcinit\|$ |
| | $\|b\| = e$ | $\%\|b\| := impl(e)$ |

| Original function signature | Transformed function signature |
|---|---|
| $@f \; x_0 : \tau_0, x_1 : \tau_1, ..., xn : \tau_n$ | $@f \; x_0 : \tau 0, \|x_0\| : \tau_L, x_1 : \tau_1, \|x_1\| : \tau_L ..., x_n : \tau_n, \|x_n\| : \tau_L$ ($\tau_L$ is the type for run-time representation of labels |

FIG. 4

| Instruction | Inlining constraints | Insertion instruction |
|---|---|---|
| br $e$ *tlabel flabel* | $\|gl, b\| = e$ | $\% \|gl, b\| := impl(e)$ |
| $x := $ phi $(e_0, l_0) \ldots (e_n, l_n)$ | | $clxinit(l_0, \ldots, ln); \%\|x\| := phi\ (clx_0, l_0) \ldots (clxn, ln)$ |
| psi $(r_1$ | $\|r_i, pp\| = e$ For every $i \in [1..m]$ | $\%\|r_i, pp\| := impl(e)$ |
| $x := op\ e_0 \ldots en$ | $\|x\| = e$ | $\%\|x\| = impl\ (e)$ |
| $x := $ alloca *size* | $\|x\| = e$ | $\%\|x\| = impl\ (e)$ |
| $x := $ load $e$ | $\|x\| = e$ | $\%\|x\| = impl\ (e)$ |
| store $e\ ptr$ | | (taken care by the rule for region constraints below) |
| $x := $ call $@f\ xo, x_1 \ldots x_n$ | | $\Sigma(f); x := $ call $@f\ x_0, \%\|xo\|, x1, \%\|x1\|, \ldots xn, \%\|x_n\|; \Delta_c\ (x, f)$ |
| $x := $ invoke $@f xo, x_1 \ldots xn$ | | $\Sigma(f); x := call\ @f\ x_0, \%\|xo\|, x1, \%\|x1\|, \ldots xn, \%\|x_n\|; \Delta_i\ (x, f)$ |
| ret $e$ | | Store $impl\ (\|b\|)\ @\|pcfin\|$; store $impl\ (e)\ @result$ |
| resume $e$ | | Store $impl\ (\|b\|)\ @\|pcfin\|$ |
| $x := $ catch | $\|x\| = e$ | $\%\|x\| := impl\ (e)$ |
| any @ $pp$ | $\|r, pp\| = e$ | $\%\|r, pp\| := impl\ (e)$ |

FIG. 5A

| | |
|---|---|
| $clxinit\ (\overrightarrow{labs})$ | $mkclx\ (\overrightarrow{labs}, 0)\ ;\ ...\ mkclx\ (\overrightarrow{labs}, |\overrightarrow{labs}| - 1)$ |
| $mkclx\ (\overrightarrow{labs}, i)$ | $clx_i := impl\ (\sqcup\ \{|\mathbf{gl}, b|\ \|\ b \in nconds\ (labs_i)\}^a)$ |
| $clx_0, clx_1, ..., clxn$ | Fresh local variables for a given $x$ |
| $\sum (f)$ | For all regions $r_i$ mentioned as $|r_i, \in|$ in the summary of $f$:<br>Store $@|r_i|\ impl\ (|r_{pp}|)$, also<br>Store $@\mathbf{pcinit}\ impl\ (|b|)$, also<br>For all constraints $x \leq e$ in $\mathcal{E}_I$ :<br>Check $(\%x, impl\ (e))$ |

FIG. 5B

LOW-OVERHEAD SOFTWARE TRANSFORMATION TO ENFORCE INFORMATION SECURITY POLICIES

STATEMENT REGARDING FEDERALLY SPONSORED RESEARCH OR DEVELOPMENT

This invention was made with government support under U.S. Government Contract Number FA8750-12-C-0236. The government may have certain rights in the invention.

CROSS-REFERENCE TO RELATED APPLICATIONS

This is a Non-Provisional patent application of U.S. Provisional Application No. 62/500,827, filed in the United States on May 3, 2017, entitled, "Low-Overhead Software Transformation to Enforce Information Security Policies," the entirety of which is hereby incorporated by reference.

BACKGROUND OF INVENTION

(1) Field of Invention

The present invention relates to a system for enforcing security policies and, more particularly, to a system for enforcing security policies with low run-time overhead.

(2) Description of Related Art

The software security and services market is large and growing. Within the software security space, the code review and analysis tools market is a leading component. As static analysis for security becomes standard in the systems development process, it becomes paramount that robust tools, tailored to the security demands in any product line that interfaces with third-party software, are adopted.

Information flow policies allow capturing a large class of security concepts. A significant majority of the commonly recognized top software vulnerability classes are a form of information flow policy violations. Overall, secure information flow can serve as an important foundation for future software systems. Cornell's Jif (see List of Incorporated Literature References, Literature Reference No. 20) is a security-typed extension of Java with support for confidentiality, integrity and declassification. However, the code supplier provides a fixed policy, and the code consumer has little ability to verify their own security requirements. Furthermore, usage studies have shown that its security error messages have a high false positive rate.

A number of other prior approaches only consider strict noninterference and do not support legitimate declassification policies. For instance, Galois's Cift (see Literature Reference No. 28) is an entirely static conservative abstract interpretation-based information flow visualization tool for C programs focusing on strict noninterference. It requires annotations by the developer in order to refine the defaults and does not address the needs of the code consumer. Medel et. al. developed SIFTAL, a typed assembly language for enforcing only strict noninterference (see Literature Reference No. 19). SIFTAL requires explicit annotations.

INRIA's FlowCaml (see Literature Reference No. 23) has a tool which links together compilation units, each with its own security policy, by computing the union of all the security policies. However, its security constraints do not take into account subtle declassifications. Additionally, University of California Santa Barbara (UCSB) researchers have designed and simulated hardware-based techniques for controlling information flow, which also do not consider expressive policies. Other researchers have considered model checking approaches, but they also only apply to strict noninterference. Moreover, model checking suffers for state explosion.

Moore and Chong (see Literature Reference No. 18) have explored the theoretical underpinnings of the static side of the hybrid information flow enforcement, but have neither attempted to work out the theory of the requisite dynamic monitoring algorithms, nor attempted to create an implementation based on their ideas. Furthermore, Chudnov and Naumann (see Literature Reference No. 12) and Bichhawat et al. (see Literature Reference No. 8) implemented purely runtime monitors, which do not support expressive policies and which impose a high runtime overhead.

Thus, a continuing need exists for a system that enables enforcing of information security policies with better precision than current static methods and less run-time overhead than current run-time methods.

SUMMARY OF INVENTION

The present invention relates to a system for enforcing security policies and, more particularly, to a system for enforcing security policies with low run-time overhead. The system comprises a computing facility connected to a network, the computing facility hosting software, the software comprising steps of transforming an original software by inserting additional instructions into the original software, resulting in transformed software; and based on the additional instructions, determining at run-time whether proceeding with execution of the original software is in accordance with a predefined policy. Transforming the original software relies on software analysis to determine whether any run-time checks normally inserted into the original software can be safely omitted. The transformed software prevents unauthorized information from passing to the network.

In another aspect, the predefined policy is formatted as a function summary, and wherein the function summary comprises equational propagation constraints and inequational enforcement constraints, wherein equational propagation constraints assign labels to outputs as a function of inputs, and inequational enforcement constraints specify upper bounds on function inputs.

In another aspect, in producing a function summary, the system reduces the equational propagation constraints to two sets of level constraints comprising a set of ceilings and a set of floors; processes the set of ceilings and the set of floors separately to simplify the equational propagation constraints; and merges the inequational enforcement constraints.

In another aspect, function summaries are merged for function pointers.

In another aspect, the predefined policy is an information flow security policy.

In another aspect, the software analysis comprises determining intervals to bound a possible run-time state.

In another aspect, the predefined policy is an information flow security policy, and the software analysis comprises determining intervals of possible security contexts of at least one of a program counter and a program data at run-time.

In another aspect, the system enforces information flow policies utilizing a hybrid approach that combines a first static analysis pass and a second run-time monitoring pass.

In another aspect, the first static analysis pass is performed to discover definite information flow violations and flag potential information flow violations for the second run-time monitoring pass.

In another aspect, the second run-time monitoring pass modifies the original software by inlining a run-time monitoring component.

In another aspect, the second run-time monitoring pass inline monitors only information flows flagged as potential information flow violations by the first static analysis pass.

In another aspect, a software that may violate the pre-defined policy is augmented with inlined run-time checks.

In another aspect, the transformed software enforces an information flow security policy that prevents access to a mobile device for unauthorized users.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is a table illustrating block and function transforming rules according to embodiments of the present disclosure;

FIG. 5A is a table illustrating instruction transformation rules according to embodiments of the present disclosure;

FIG. 5B is a continuation of FIG. 5A illustrating a table of instruction transformation rules according to embodiments of the present disclosure;

DETAILED DESCRIPTION

Figure 1:
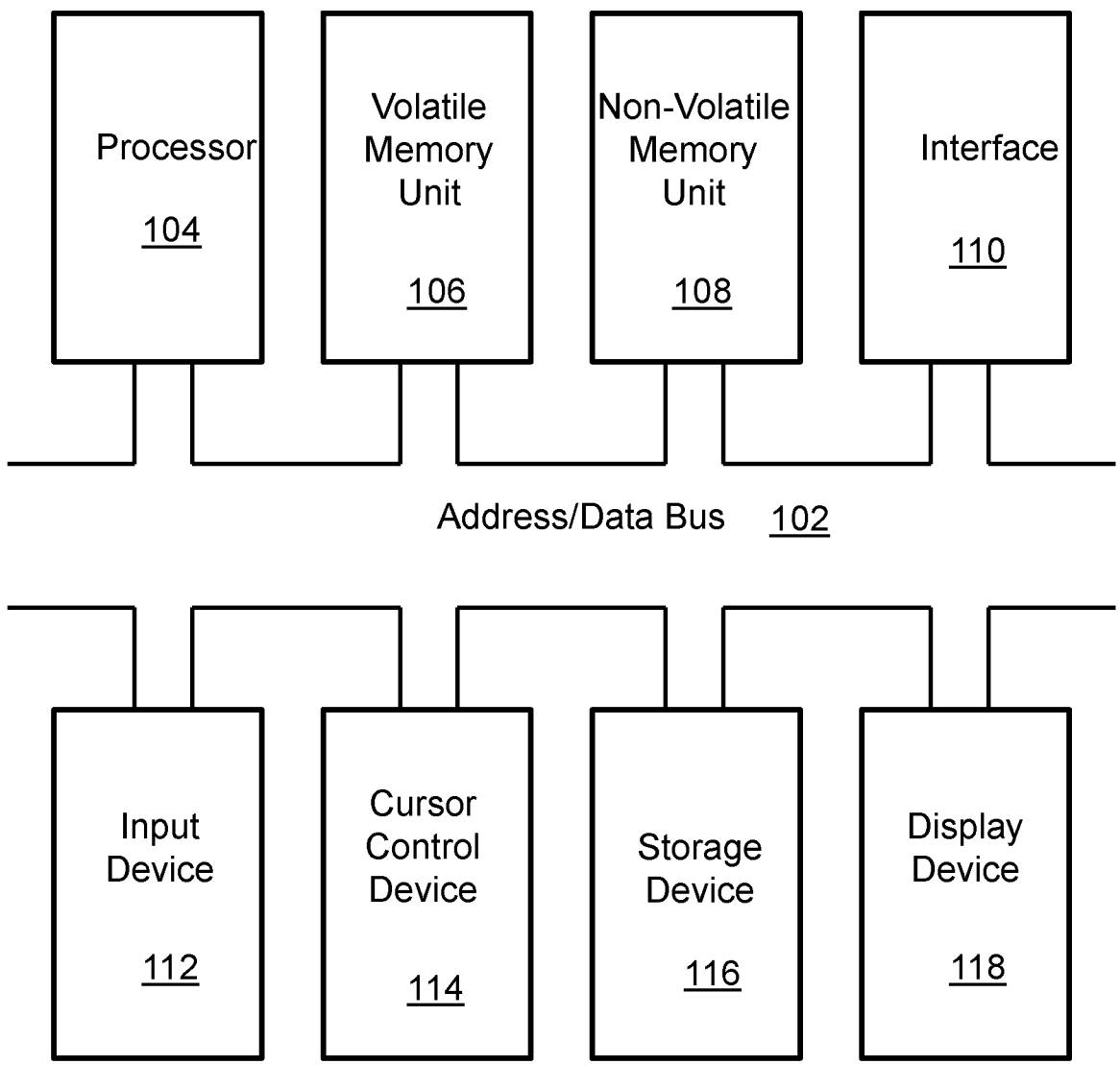
FIG. 1 is a block diagram depicting the components of a system for enforcing security policies according to some embodiments of the present disclosure.

The present invention relates to system for enforcing security policies and, more particularly, to a system for enforcing security policies with low run-time overhead. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Aslan Askarov, Stephen Chong, and Heiko Mantel. Hybrid monitors for concurrent noninterference. In Proceedings of the 28th IEEE Computer Security Foundations Symposium, 2015.
2. Aslan Askarov and Andrew C. Myers. Attacker control and impact for confidentiality and integrity. Logical Methods in Computer Science, 7(3), 2011.
3. Aslan Askarov and Andrei Sabelfeld. Catch me if you can: permissive yet secure error handling. In Proceedings of the 2009 Workshop on Programming Languages and Analysis for Security, (PLAS), pages 45-57, 2009.
4. Aslan Askarov and Andrei Sabelfeld. Tight enforcement of information-release policies for dynamic languages. IEEE Computer Security Foundations Symposium, pages 43-59, 2009.
5. Thomas Ball. What's in a region? or computing control dependence regions in near-linear time for reducible control flow. LOPLAS, 2(1-4):1-16, 1993.

6. Anindya Banerjee and David A. Naumann. Stack-based access control for secure information flow. Journal of Functional Programming, 15(2):131-177, 2005. Special issue on Language Based Security.
7. Anindya Banerjee, David A. Naumann, and Stan Rosenberg. Expressive declassification policies and modular static enforcement. In 29$^{th}$ IEEE Symposium on Security and Privacy, pages 339-353, 2008.
8. Abhishek Bichhawat, Vineet Rajani, Deepak Garg, and Christian Hammer. Information flow control in webkit's javascript bytecode. In Martin Abadi and Steve Kremer, editors, Proceedings of the Third International Conference on Principles of Security and Trust (POST'14), volume 8414 of Lecture Notes in Computer Science, pages 159-178. Springer, 2014.
9. Franz Baader and Wayne Snyder. Unification theory. In John Alan Robinson and Andrei Voronkov, editors, Handbook of Automated Reasoning (in 2 volumes), pages 445-532. Elsevier and MIT Press, 2001.
10. Andrey Chudnov, George Kuan, and David A. Naumann. Information flow monitoring as abstract interpretation for relational logic. In IEEE Computer Security Foundations Symposium, pages 48-62, 2014.
11. Andrey Chudnov and David A. Naumann. Information flow monitor inlining. In 2010 23rd IEEE Computer Security Foundations Symposium, 2010.
12. Andrey Chudnov and David A. Naumann. Inlined information flow monitoring for JavaScript. In Proceedings of the 22nd ACM SIGSAC Conference on Computer and Communications Security—CCS'15. Association for Computing Machinery (ACM), 2015.
13. Dorothy E. Denning. A lattice model of secure information flow. Communications of the ACM, 19(5):236-243, May 1976.
14. Catalin Hritcu, Michael Greenberg, Ben Karel, Benjamin C. Pierce, and Greg Morrisett. All your IFCException are belong to us. In IEEE Symposium on Security and Privacy, pages 3-17, 2013.
15. Daniel Huang and Greg Morrisett. Formalizing the SAFECode type system. In Certified Programs and Proofs—Third International Conference, CPP, volume 8307 of Lecture Notes in Computer Science, pages 211-226, 2013.
16. Chris Lattner and Vikram S. Adve. Automatic pool allocation: improving performance by controlling data structure layout in the heap. In PLDI, pages 129-142, 2005.
17. Gurvan Le Guernic, Anindya Banerjee, Thomas Jensen, and David A Schmidt. Automata-based confidentiality monitoring. In Advances in Computer Science-ASIAN 2006. Secure Software and Related Issues, pages 75-89. Springer, 2006.
18. Scott Moore and Stephen Chong. Static analysis for efficient hybrid information-flow control. In Proceedings of the 24th IEEE Computer Security Foundations Symposium, pages 146-160, Piscataway, N.J., USA, June 2011. IEEE Press.
Ricardo Medel, Adriana B. Compagnoni, and Eduardo Bonelli. A typed assembly language for non-interference. In Theoretical Computer Science, 9th Italian Conference, volume 3701 of Lecture Notes in Computer Science, pages 360-374. Springer, 2005.
19. Andrew C. Myers. J F low: practical mostly-static information flow control. In POPL '99: Proceedings of the 26th ACM SIGPLAN-SIGACT symposium on Principles of programming languages, pages 228-241. ACM, 1999.
20. David A. Naumann. Verifying a secure information flow analyzer. In 18th International Conference on Theorem Proving in Higher Order Logics (TPHOLS), volume 3603, pages 211-226, 2005.
21. Keshav Pingali and Gianfranco Bilardi. Optimal control dependence computation and the Roman chariots problem. ACM Trans. Program. Lang. Syst., 19(3):462-491, 1997.
22. Alejandro Russo and Andrei Sabelfeld. Dynamic vs. static flow-sensitive security analysis. In Computer Security Foundations Symposium, pages 186-199. IEEE, 2010.
23. Vincent Simonet and Inria Rocquencourt. Flow Caml in a nutshell. In Proceedings of the first APPSEM-II workshop, pages 152-165, 2003.
24. JosFragoso Santos and Tamara Rezk. An information flow monitor-inlining compiler for securing a core of JavaScript. In ICT Systems Security and Privacy Protection, volume 428 of Advances in Information and Communication Technology. IFIP, 2014.
25. Andrei Sabelfeld and David Sands. Dimensions and principles of declassification. Journal of Computer Security, 2007.
26. Viorica Sofronie-Stokkermans. On unification for bounded distributive lattices. ACM Trans. Comput. Logic, 8(2), April 2007.
27. Peter Thiemann. Towards specializing JavaScript programs. In Lecture Notes in Computer Science, pages 320-334. Springer, 2015.
28. Joe Hurd, Aaron Tomb, and David Burke. Visualizing Information Flow through C programs. Galois Tech Talk, 2010.

(2) PRINCIPAL ASPECTS

Various embodiments of the invention include three "principal" aspects. The first is a system for enforcing security policies. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information.

Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
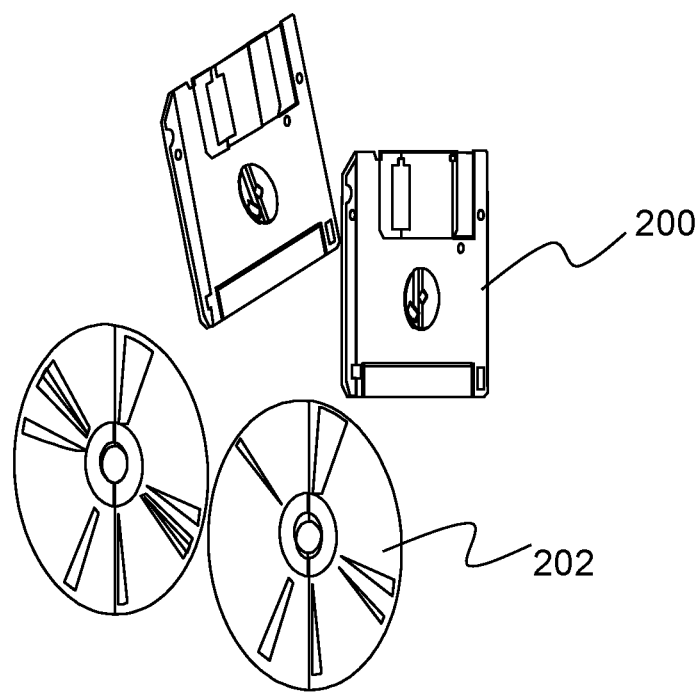
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION (3.1) Overview

Described is a system and method for precise enforcement of information flow security policies in computer programs. At a high level, there are two styles of information flow security policies enforcement strategies: static and run-time. In static information flow policy enforcement, the software (either in source code form, in binary code form, or in some other representation) is analyzed before it is executed (e.g., as part of the software development and validation process, at compile-time, when the software is first acquired). Typically, static analysis approaches suffer from a relatively low precision, in particular high rate of false positives, compared to other approaches. Run-time monitoring, as its name suggests, postpones the enforcement till the run-time. Run-time enforcement typically suffers from high overhead. In addition, pure run-time monitoring can only capture explicit flows, and is unable to fully capture implicit flows (i.e., the leakage of information about the code paths not taken).

The invention described herein is a hybrid approach to enforcing information flow policies. First, a static analysis pass is performed to discover the more certain information flow violations. In contrast to the pure static analysis approaches, the less certain potential violations are not reported as policy violations at the point of static analysis, but are rather postponed until run-time. The second pass modifies the code by inlining a run-time monitoring component. The inlining pass takes advantage of the static pass by only inlining monitoring for those flows that the static analysis flagged as potential violations, and not performing any inlining (and, therefore, not incurring any future run-time overhead) for those flows that the static analysis have determined to not contain any potential violations.

The system described herein was built, in part, on insights from previous efforts in Language-based Information Flow Security. Cornell's Jif (see Literature Reference No. 20) is a security-typed extension of Java with support for confidentiality, integrity, and declassification. However, the code supplier provides a fixed policy, and the code consumer has little ability to verify their own security requirements. Furthermore, usage studies have shown that its security error messages had a high false positive rate.

The system according to embodiments of the present disclosure uses a simplified model of LLVM IR (see section (3.2) for details). In addition, it does not distinguish between explicit and implicit flows that is, it tracks only the combined "implict+explicit" flow. However, in some applications of the invention, it may be desirable to track these two kinds of flows separately (e.g., in order to apply a less restrictive policy to implicit flows and a more restrictive policy to explicit flows). It would be straightforward for somebody skilled in the art to incorporate such a distinction into the invention (e.g., by replacing a single security label with a pair of labels: one for explicit flows, and one for implicit flows.)

The original motivation of security monitor inlining was reducing run-time overhead by specializing the instrumentation to a specific program and policy. This was also one of the motivations for inlining information-flow monitors: Chudnov and Naumann (see Literature Reference No. 11) suggested that constant folding and propagation, and dead code elimination (all standard compiler optimizations) could be used to specialize an inlined monitor. This approach is called "post-optimization". While this works great for simple languages, the reality of monitor inlining for practical languages (see Literature Reference No. 12) is such that the instrumented code is no longer easily amenable to off-the-shelf compiler optimizations. One could coach the optimizer to recognize the flow tracking and checking instrumentations and apply domain-specific knowledge to specialize them. However, it requires developing new algorithms and software, as opposed to reusing the existing ones. Additionally, performant and sound program specialization is very hard (see Literature Reference No. 28).

In this disclosure, a different approach, "pre-optimization", is described and shown to be simpler and more scalable for practical languages (e.g., LLVM IR). There are two ideas behind the approach. The first is separation of algorithms for deciding whether to monitor at all, what flows to track at run-time and how to track them. This separation is facilitated by use of constraints over lattice elements, which encode information-flow semantics and serve as an interface.

The second idea is making the static analysis aware of its over-approximation. The analysis computes both the over- and under-approximations on the information-flow labels that could be seen with full run-time monitoring. The difference between the computed approximations is called a gap, which is used to decide whether monitoring is called for and which labels to track at run-time.

The result of static analysis is no longer a binary "secure/insecure", but three-valued "definitely secure/maybe secure/definitely insecure". If the program is deemed definitely secure, then all of its runs respect the policy and no monitoring is necessary. This allows appreciation that static and dynamic enforcement of information flow are not mutually exclusive, but complement each other; static analysis helps optimize dynamic monitoring, and monitoring helps refine the results of static analysis at run-time. To make the approach more practical, the following are supported: information-flow contracts for 3rd party (library) calls in form of pre- and post-conditions on labels of inputs and outputs; perform per-function interprocedural analysis by inferring function summaries: pre- and post-conditions on labels, which include both over- and under-approximations, and perform per-function interprocedural inlining with optional label specialization that allows us to trade extra code size for run-time performance.

The policy idea, detailed in section (3.3.3), is as follows: For a function $f$ considered to read and return inputs at level L, its result (or effect on memory) is defined by an equation result=L; and for a function $f$ considered to write output, its argument (or referenced memory location) is constrained by an inequation output≤L. All of the above is modular, powered by lattice constraints.

Figure 3A:
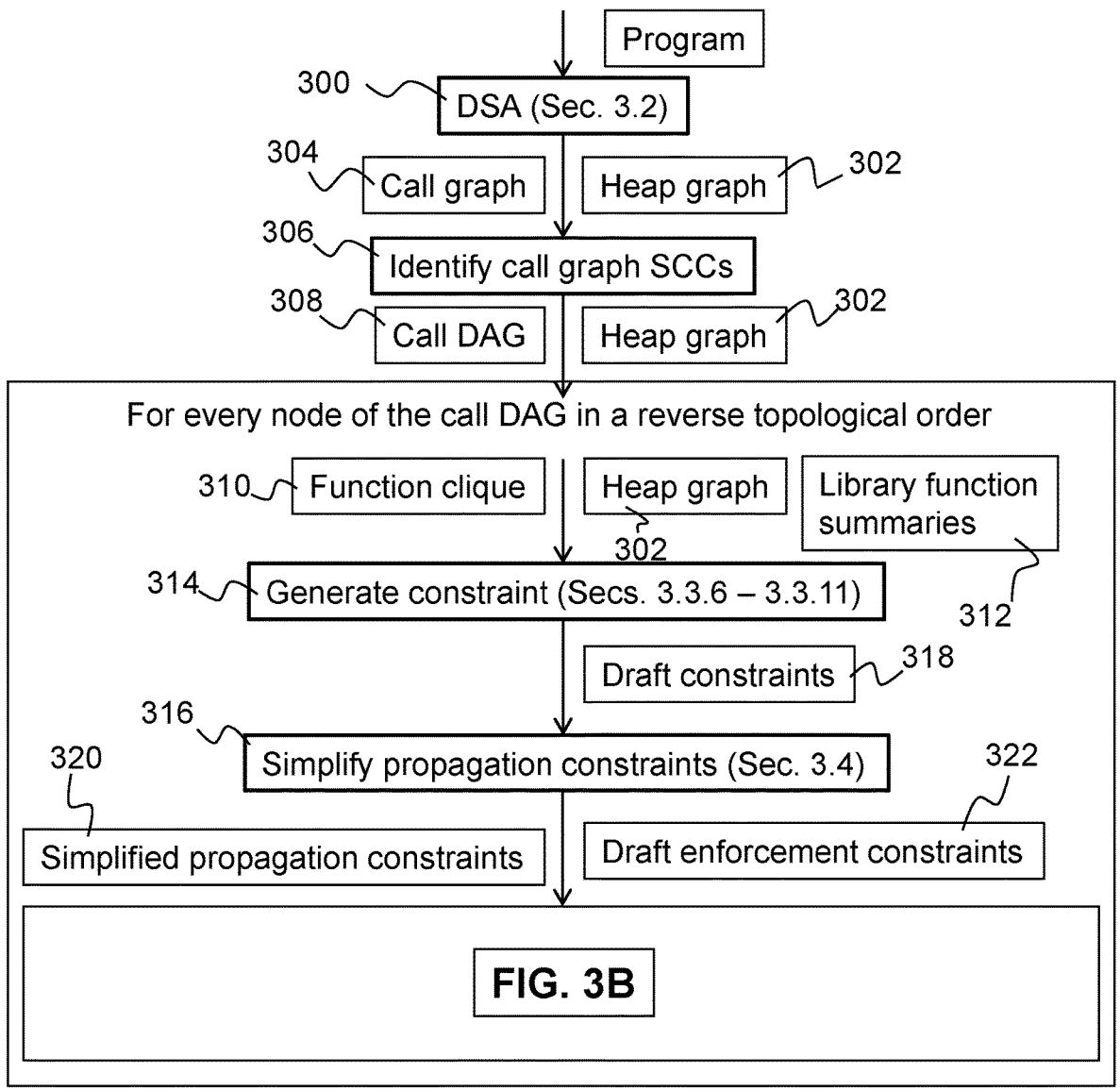
FIG. 3A is a flow diagram illustrating an analysis architecture according to embodiments of the present disclosure.
Figure 3B:
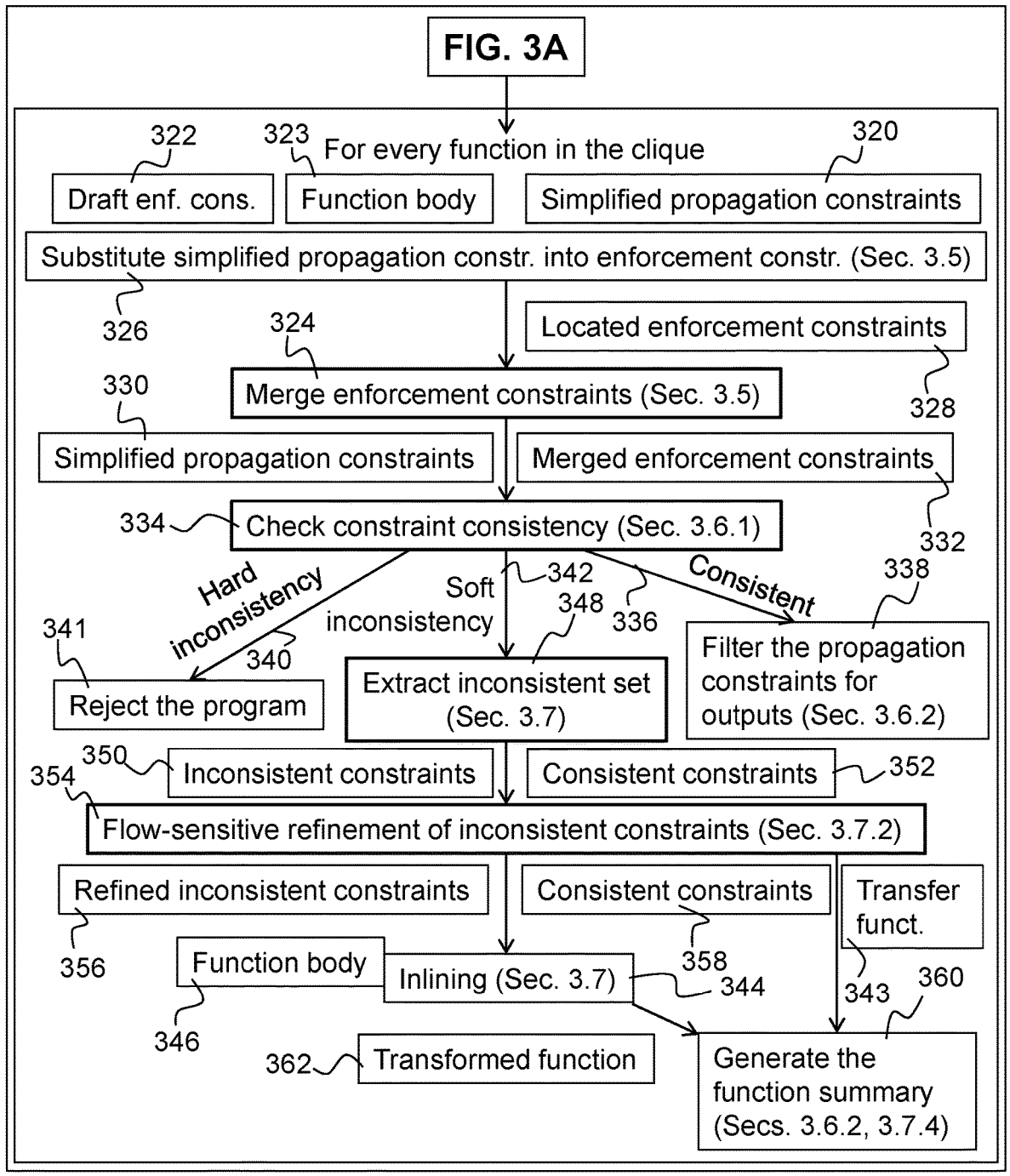
FIG. 3B is a flow diagram illustrating the analysis architecture continuing from FIG. 3A according to embodiments of the present disclosure.

An overview of the overall analysis and inlining algorithm is given in FIGS. 3A and 3B, which identify all of the major steps of the process described herein, as well as all the artifacts consumed and produced by the process. The blocks connected by the arrows are steps. If there is an arrow from A to B, and there are blocks C and D drawn next to that arrow, that indicates that step A produces artifacts C and D, and that subsequent step B consumes those artifacts.

The focus is on the following scenario. Some policies are given, for functions in some application program interfaces (APIs) of interest. Assume policies are in the form of function summaries (as defined later), which consist of propagation constraints that assign labels to outputs as a function of inputs, and enforcement constraints that specify literal upper bounds on function inputs. Policies do not necessarily reflect the actual behavior of the API implementation; rather, they are a way for administrators to specify security requirements. Code is given for some functions, which is to be analyzed/monitored for conformance with the API policies. Code to be analyzed should be API-closed in the sense that it compiles against the interface provided by the APIs.

A related scenario is for API developers to check their code for consistency with a specified policy for that function. This scenario is not pursued, although it is encompassed by the techniques provided herein: compute the code summary and check refinement with respect to the specified policy. Two approaches to under-approximation were investigated. In the first approach, lattice meets are used in place of joins. That has the advantage that constraints are manipulated in almost the same way for both over- and under-approximation: at control-flow join points, meet is used instead of join. However, in some situations it is overly optimistic in the sense that the underapproximation indicates that there are some secure executions, so that monitoring may be useful, when in fact there are no secure runs. This is described in section (3.3.5).

The second approach is more precise: it uses disjunctions to encode constraints for different control flow paths. There is reason to believe the resulting blowup in constraints is not prohibitive in this setting.

(3.2) Background

The programming language is similar to Low Level Virtual Machine intermediate representation (LLVM IR), but idealized for clarity. Static analyses is relied upon including, most importantly, Data Structure Analysis (DSA) (FIG. 3A, element 300), which provides a static graph of heap memory (heap graph; FIG. 3A, element 302) to which labels can be attached (see Literature Reference No. 16).

(3.2.1) muLLVM Syntax and Semantics

A program is a collection of functions with C-like signatures. A function body is a list of instructions. Instructions are simplified from LLVM: detailed type information is omitted and fewer data types are used. To facilitate defining the analysis, the IR is extended to include a new "psi" instruction that is somewhat like a phi instruction for DSA nodes. The syntax for it is:

psi $(r_1: pp_{11}, pp_{12}, \ldots pp_{1k1}) \ldots (r_m: pp_{m1}, pp_{m2}, \ldots pp_{mkm})$, where $r_i$ are regions and $pp_{ij}$ are the program points where region $r_i$ was last assigned on each incoming control-flow path. In the actual implementation, there is no such instruction, but the effect is achieved using metadata in the abstract syntax tree.

The following assumptions are relied on. (1) IR satisfies the usual LLVM constraints including phi instructions only at the start of blocks. (2) A psi instruction occurs at the start of every basic block, and nowhere else. (3) Each instruction is located at a program point pp, and program points are unique within the code of a function (e.g., use line numbers as program points). (4) The treatment of exceptions is simplified. The following is the syntax for invoke and landing pad instructions:

x:=invoke @funcname $arg_0 \ldots arg_n$ retblock exnblock
x.=catch.

As in LLVM, exceptions are thrown by invoking a library routine that does an exceptional return (after allocating and initializing the exception value) via the resume instruction. The invoke instruction is similar to a call but it is a block terminator, and it takes explicit arguments to designate the successor for normal and exceptional (resume) return. Instead of LLVM's landing pad instruction, the catch instruction is used, which is only allowed as the first non-phi instruction in a block. The exnblock in an invoke must be a block with catch. All predecessors of a block with catch must be terminated by invoke instructions. (5) In call and invoke instructions, the arguments are all variables. This loses no generality but avoids the clutter to deal with literal values in these instructions.

(3.2.2) Auxiliary Analyses

Since control flow in LLVM IR instructions is not explicitly scoped, an (intra-procedural) control-flow graph is used. Every node of the graph corresponds to an LLVM basic block.

To analyze a function body, given control flow and DSA analyses was relied on. A basic block is uniquely identified by the label on its first instruction; there is not always a distinction between a block and its identifier.

nconds∈Block→$2^{Block}$ maps each basic block to a set of basic blocks, such that b ∈ nconds(c) if there is a path in the control flow graph from b to c that contains no immediate postdominator of b. Note that if b ends with an unconditional branch to c, then b is not in nconds(c), because c itself is an immediate postdominator of b. Informally, nconds(c) is the set of blocks that end in a branch on which c is control dependent. Note that control-dependence here is intransitive. The definition is similar to that in previous work. Ball (see Literature Reference No. 5) defined conds(n) to be the set of edges that n is control-dependent on, and Pingali and Bilardi (see Literature Reference No. 22) came up with a linear-time algorithm to compute the set (specifically, the algorithms ConstructRomanChariots (FIG. 4 of Literature Reference No. 22), CondsPreprocessing (FIG. 7 of Literature Reference No. 22) and CondsQuery (FIG. 6 of Literature Reference No. 22)); nconds could be derived easily from conds by taking the initial vertices of all the edges in the resulting set. nconds(x)={$n_i|n_1 \rightarrow m_j \in$conds(x)}.

The algorithm for nconds (listed below) presents a simpler but quadradic algorithm to compute nconds, given the postdominator tree. If the graph has several exit nodes, and thus a postdominator forest, for the purposes of the algorithm a postdominator tree can be created by adding a new root node whose children are the roots of the forest. This works because the new root node has no successors in the CFG and, thus, would never show up in nconds.

DSA(p) is a region (node ID) associated with a pointer expression p. To be very precise, the DSA function also depends on where in the IR the expression occurs, but notation is abused and that is ignored.

lastAssgn(r, pp) is either (a) the program point qq which is the most recent assignment (i.e., that is, qq is within the same block as pp and is the largest program point less than pp at which r is assigned) to a location in r prior to pp, or (b) the token in if there is none. In case a), qq is either a store or alloca instruction within the block that contains pp, or it is the psi node at the beginning of said block. The reason it is assumed there is a psi node for every block is to make it easy to compute lastAssgn(r, pp). Case (b) only occurs prior to any stores to r. Similar to DSA(p), the notation lastAssign (r, pp) doesn't make explicit that this depends on which function body pp is in. Function call graph (computed by DSA) (FIG. 3A, element 304) from which mutual recursion cliques can be obtained.

(3.3) Constraint Generation

The overall process takes as input a set F of functions to be analyzed, together with a collection S of summaries such that every function called in F is either in F or has a summary in S. The output is, for each function, a summary together with detailed constraints that are used later for inlining.

A function summary is comprised of equational propagation constraints that model how information flows through the function, and inequational enforcement constraints on inputs, required so the function does not violate policies on functions that it calls. The high level algorithm is as follows.

1. Compute the call graph (FIG. 3A, element 304) of F, ignoring calls to functions in S. Let SCC be the strongly connected components (i.e., identify call graph SCCs; FIG. 3A, element 306). These comprise the vertices of a DAG (directed acyclic graph) with an edge from C to C' just if some function in C calls some function in C' (the "exists call" relation).
2. Process the DAG (call DAG; FIG. 3A, element 308) of SCCs (element 306) bottom up, in some topological order, producing summaries that can be used for subsequent SCCs (and saving detailed constraints for use in inlining).

Processing an SCC (element 306) amounts to an instance of the overall problem: a set of functions to be analyzed (i.e., function clique 310), together with summaries for any other functions called (i.e., library function summaries 312). An SCC (element 306) has either a single function, which may or may not be recursive, or has multiple functions that are mutually recursive. It is assumed that the call graph (element 304) is as produced by DSA (i.e., for calls of function pointers it includes the possible callees).

Below is an algorithm for nconds. This is a version of the algorithm from Literature Reference No. 22, reworked for node control-dependence and simplified for full caching of nconds sets. Here, PDT is the postdominator tree, b is the block label. For a control-flow graph CFG, nodes(CFG) is the set of its nodes, and preds(n, CFG) and succs(n, CFG) are the predecessors and successors of a node n. Also, parent(x, PDT) and children(x, PDT) return the parent and the set children of a node x in the postdominator tree PDT.

```
procedure NCONDS(CFG, PDT)
    NCondsMap    A total map from nodes(CFG) to sets of nodes
    for all n ∈ nodes(CFG) do
        NCondsMap [n] ← ∅
    end for
    NCondsMap ← ComputeNConds (root (PD]), NCondsMap, CFG, PDT)
    return NCondsMap
end procedure
procedure COMPUTENCONDS(b , NCondsMap, CFG, PDT)
    for all p ∈ preds(b,CFG) do
        if |succs(p, CFG)| > 1 ∧ b ≠ parent(p, PDT) then
            NC ondsMap[b] ← NCondsMap[b] ∪ {p}
        end if
    end for
    for all c ∈ children(b,PDT) do
        NCondsMap ← ComputeNConds(c, NCondsMap, CFG, PDT)
        NCondsMap[b] ← NCondsMap[b] ∪ [NCondsMap[c]]
    end for
    for all c ∈ children (b, PDT) do
        NCondsMap[b] ← NCondsMap[b]\{c}
    end for
    return NCondsMap
end procedure
```

(3.3.1) Gaps and Constraints

The underlying lattice of levels $\mathcal{L}$ has the form $\langle \text{Lev}, \leq, \bot, \top, \sqcup, \sqcap \rangle$ where Lev is a finite set (of "levels") and the rest are as usual following Denning (see Literature Reference No. 13). In particular, $l \leq l'$ means that flow is allowed from l to l'. One leading example is the taint lattice {trusted, untrusted}, where trusted≤untrusted and not the reverse. Note that ⊥=trusted and ⊤=untrusted. Another important example is the 4-point lattice {PT, PU, ST, SU} for Public Trusted, Public Untrusted, Secret Trusted, . . . , where PT≤PU, PU≤SU, PT≤ST, ST≤SU. Later lattice expressions are considered, obtained by adding "level variables".

The gap structure Gap($\mathcal{L}$) is the set of pairs of levels l, u, written as [l..u]. Gaps [l..u] are used for static analysis of dependency, in such a way that the upper part tracks the worst-case (pessimistic), and the lower part tracks the best-case (optimistic). In other words, the gap means the information must be at least l and may be as high as u but no higher. A gap [l..u] has the interval property provided that l≤u. Dependency analysis generates propagation constraints in which gaps have the interval property. However, policies give rise to enforcement constraints where the interval property needs to be turned on its head, as explained later.

Gaps form a lattice but also support merge operations.

$[l..u] \sqsubseteq [m..v] \Leftrightarrow l \leq m \wedge u \leq v$ (gap ordering)

$[l..u] \sqcup [m..v] = [l \sqcup m..u \sqcup v]$ (lifted join)

$[l..u] \oplus [m..v] = [l \sqcap m..u \sqcup v]$ (gap merge)

$[l..u] \otimes [m..v] = [l \sqcup m..u \sqcap v]$ (dual merge)

$\lfloor[l..u]\rfloor = l$ and $\lceil[l..u]\rceil = u$ (floor and ceiling parts)

The terms ceiling and floor are used to refer to u and l in [l..u], catering for the common case that the gap is an interval. The interval property is preserved by lifted join and gap merge, but not dual merge. For example, [PU..PU]⊗[ST..ST] is [SU..PT]. The gap merge operator is used to propagate labels in static analysis, via equational constraints. It forms a join of ceilings. For the floor, meet is used so that a single level can serve as approximation. The alternative is to explicitly represent the disjunction of possibilities, but this leads to combinatorial explosion and more complicated implementation so a choice was made not to pursue that design (see Section (3.3.5).

The dual merge ⊗ and meet ⊓ are used only to combine enforcement constraints, which specify upper bounds on the labels of inputs. Because the gap operations are defined in terms of level operations, gap constraints can be reduced to level constraints. However, opportunistic simplifications in terms of gaps may be useful so the following are some elementary properties which are straightforward to check. The operations ⊕ and ⊔ preserve the interval property; ⊕ and ⊔ are monotonic with respect to ⊑; ⊔ of gaps has the join property: I⊔J⊑K if I⊑K∧J⊑K; gaps are a lattice with ordering ⊑ and bottom and top elements [⊥..⊥] and [⊤..⊤], and the intervals also form a lattice with the same join, top, and bottom; I⊑J implies ⌊I⌋≤⌊J⌋ and ⌈I⌉≤⌈J⌉; if $\mathcal{L}$ is distributive, then for any gaps I, J, K, there is:

$I \oplus (J \sqcup K) = (I \oplus J) \sqcup (I \oplus K)$ and $I \sqcup (J \oplus K) = (I \sqcup J) \oplus (I \sqcup K)$ and, thus, $(I \sqcup J) \oplus (K \sqcup L) = (I \oplus K) \sqcup (I \oplus L) \sqcup (J \oplus K) \sqcup (J \oplus L)$.

In one embodiment, labels are pairs (E, I) of gaps, where E represents explicit flow and I represents implicit flow. The implicit flow from a branch condition is derived from the explicit and implicit flow to its condition expression. In assignments, the implicit part joins the implicit part of the assigned value with the implicit flow of the context. In policy checks, the implicit and explicit parts are usually joined. These are the highlights, and they apply both to static analysis and to monitoring. The main purpose of this separation is to provide for selective declassification of implicit flow. For example, one practical policy requires pointers to have integrity. However, allocation of data structures may be influenced by conditional checks on untrusted inputs, so some implicit flow is inevitable; to avoid label creep it should be ignored. Explicit/implicit separation is straightforward and orthogonal to concerns in this disclosure, so it is not formalized. Separating the implicit from explicit would require defining "labels" to be pairs of gaps; however in this disclosure, the term "label" is used as a synonym for gap.

(3.3.2) Function Summaries (element 312)

Define label expressions and label constraints as follows:

labLit::=[l..u] for l,u in $\mathcal{L}$ lbxp::=labLit|labVar|lbxp*lbxp (where * is ⊔,⊕,⊗)

labConstr::=lbxp=lbxp|lbxp⊑labLit.

The intended interpretation of the operators ⊔ and ⊕ in label expressions is the same as for label values as in Section (3.3.1). This interpretation is extended to label expressions by translation to level expressions.

For label variables, names that are mnemonic are used for the associated program elements, and also to distinguish between function inputs and outputs. A function's summary may refer to variables with the following names.
|var| where var is a parameter
|r,in| and |r,out|, where r is a DSA node (which designates a memory region); these are interpreted as the initial and final labels.
|result| and |except| for the normal return and exceptional return
|pcinit| and |pcfin| for the implicit flow at the call site and its return Definition 1: For a given function, the input labels are label variables of the form |param|, |r,in|, and |pcinit|. The output labels are label variables of the form |result|, |pcfin|, |except|, and |r,out|. A draft summary contains only constraints of the following forms.
$lbxp_{out} = lbxp_{in}$ where $lbxp_{out}$ is an output label and $lbxp_{in}$ is an expression over input labels (these are the propagation constraints).
$lbxp \sqsubseteq labLit$ where lbxp is an expression over input labels (these are the enforcement constraints).

A valid summary is a draft summary in which a given expression occurs on the left of at most one constraint. Note that the propagation constraints play two roles. For summaries derived from policies, they serve to express policy on program inputs, in terms of the output of library functions that obtain program inputs. For summaries obtained by analysis of code, they serve to soundly approximate the behavior of that code.

By algebraic properties the expression can be written as a join of merges, and joins can be decomposed to separate inequations. In the absence of merges, this means one could restrict further, to $lvar \sqsubseteq labLit$, where lvar is an input label.

(3.3.3) Policies

Function summaries (element 312) are expressed as constraints on the initial and final levels of the arguments, DSA nodes and the return value. Function summaries (element 312) are derived by the analysis, using summaries derived from given policies. In contrast, policies are intended to be written by an analyst. Policies get translated to summaries, so for prototype implementation, policies could be written directly as summaries. Policies are expressed using code-oriented syntax. Define policy constraint expressions and constraints by:

$litlev \in \mathcal{L}$ $gvar \in$ global variables expr::=gvar|param|*expr|expr+num|result|except cexpr::=litlev|inlev(expr)|outlev(expr)|cexpr⊆cexpr constraint::=cexpr≤cexpr|cexpr=cexpr.

Note that result and except are distinguished variables used to refer to the normal and exceptional return values. Note that inlev(var) refers to the value of the variable itself, whereas inlev(*var) refers to the referenced memory location(s).

This caters for code-oriented syntax, but it doesn't let one distinguish between, say, inlev(*p) as a single word or buffer segment or structure. Currently, DSA is entirely relied upon, so the granularity is that of the DSA node for *p. That is, the locations are determined by whatever type DSA gives the node.

Policy constraints are restricted to these forms:
Definition 2: For a given function, these are the valid policy constraint expressions:
    inlev(param) where param is one of the parameters
    outlev(result) and outlev(except)
    inlev(gvar) and outlev(gvar)
    inlev(*expr) and outlev(*expr).

A valid policy for the function is a collection of constraints over valid expressions. Constraints have one of two forms:
(enforcement policy, inequational constraint) inlev(expr) ≤litlev (propagation policy, equational constraint) outlev (*expr)=cexpr and outlev(x)=cexpr where x is result, except or a global variable and cexpr only refers to input levels and literals.

Moreover, (a) the left sides of inequational constraints are distinct; and (b) the left sides of equational constraints are distinct. Condition (a) loses no generality because two constraints inlev(e)≤lit and inlev(e)≤lit' with the same left side can be expressed as inlev(e)≤lit", where lit" is the meet of lit and lit'. Condition (b) facilitates manipulation of constraints and seems adequate for practical policies. It also rules out inconsistent policies like outlev(result)=⊤ combined with outlev(result)=⊥.

(3.3.4) Reducing Gap Constraints to Level Constraints

It may be useful, for performance, to do some constraint simplification and consistency checking in terms of label expressions. However, ultimately simplification and consistency checking need to be done in terms of levels, as labels are parameterized on the lattice of levels. To this end, a label constraint $lxbp \sqsubseteq lxbp'$ is translated to a pair of level constraints, one for the ceiling (pessimistic) part and one for the floor (optimistic) part. Separating floors from ceilings also lets one formulate that ceilings are sound with respect to noninterference.

The basic idea is to expand the definitions in Section (3.3.1), but here there are expressions that contain variables. To make this precise, two translation functions are defined that are suggestively named in reference to the functions $\lceil - \rceil$ and $\lfloor - \rfloor$ (from gaps to levels). The translation functions that map label expressions to lattice expressions are $\lceil - \rceil$ and $\lfloor - \rfloor$. Using these, translate $lxbp \sqsubseteq lxbp'$ to the constraints $\lceil lxbp \rceil \leq \lceil lxbp' \rceil$ and $\lfloor lxbp \rfloor \leq \lfloor lxbp' \rfloor$. Likewise, for an equality constraint.

In order to translate label variables, one needs corresponding level variables. For a label variable |v|, two level variables are defined with the suggestive identifiers: $\lceil |v| \rceil$ and $\lfloor |v| \rfloor$. These are used in the definition of $\lceil - \rceil$ and $\lfloor - \rfloor$ by recursion on syntax. For the example |r, in|⊑[PT..PT], one gets $\lceil r, in \rceil \leq PT$ and $\lfloor r, in \rfloor \leq PT$.

(3.3.5) On the Inadequacy of Meet-Based Constraints

During this investigation, two formulations of level/lattice constraints were considered:
  1. "meet representation": a set of equations and inequalities over lattice elements with both the meet and join operations, with each equation and inequality interpreted conjunctively. This representation is described in Section (3.3.1).
  2. "disjunctive representation": a logical formula (conjunctions and disjunctions) over equations and inequalities over join semi-lattice elements (thus, only with a join operation).

Variables: application of $\lceil - \rceil$ to |v| yields the variable $\lceil |v| \rceil$ and likewise for $\lfloor |v| \rfloor$. Literals: apply the functions from Section 3.3.1 (i.e., $\lceil [l..u] \rceil = u$ and $\lfloor [l..u] \rfloor = l$.

Operators:

$$[lbxp \oplus lxbp'] = [lbxp] \sqcup [lbxp']$$

$$\lfloor lbxp \oplus lxbp' \rfloor = \lfloor lbxp \rfloor \sqcap \lfloor lbxp' \rfloor$$

$$[lbxp \_ lxbp'] = [lbxp] \sqcup [lbxp']$$

$$\lfloor lbxp \_ lxbp' \rfloor = \lfloor lbxp \rfloor \sqcup \lfloor lbxp' \rfloor$$

$$\lfloor lbxp \otimes lxbp' \rfloor = \lfloor lbxp \rfloor \sqcap \lfloor lbxp' \rfloor$$

$$[lbxp \otimes lxbp'] = [lbxp] \sqcup [lbxp']$$

Shown above are label expressions reduced to level expressions by the functions $\lceil - \rceil$ and $\lfloor - \rfloor$ defined by structural recursion.

Due to concerns over the possible combinatorial explosion when working with the disjunctive representations, the meet representation was originally selected. Indeed, the disjunctive lattice representation will be (syntactically) larger than the meet representation for the same gap constraint set. For every merge operation in the gap constraint set, a disjunction of equations/inequalities is going to appear in the disjunctive representation versus one in the meet representation. The concern was that for simplifying and determining satisfiability of constraints one would need to convert (disjunctive) constraints from conjunctive normal form to disjunctive normal form, which would have doubled the number of terms in the resulting DNF. It was believed that this might be avoided. First, CNF (conjunctive normal form) is already the preferred form for SAT/SMT (satisfiability/satisfiability modulo theories) problems, and it would be wise to leverage SAT/SMT solvers anyway. Second, even if one had to convert DNF (disjunctive normal form) to CNF, the potential constraint sizes in the programs seen so far are not going to be prohibitive (though, experiments would be required to confirm this). Third, no good algorithm for solving arbitrary sets of equations over lattices is known (see section (3.4.3)).

Disjunctive constraints offer better precision. Here is an example that demonstrates that, even with the potentially increased complexity, disjunctive constraints are worth considering.

if (cond)
    call fST(x)
  else
    call gPU(x)

Suppose the summaries for fST and gPU require that the parameters be ST and ≤PU, respectively. Using the meet representation, obtain a constraint for the label of x:|x|≤[PU ⊔ ST..PU⊓ ST], which simplifies to |x|≤[SU.. PT]. This suggests that a secure run with |x|=SU exists, which is not true. Instead of rejecting the program as insecure, the analysis that uses meet constraints will suggest monitoring. The latter would report a violation on each run where x is at level SU. One can avoid this using the disjunctive representation. The constraints for |x| then would be: |x|≤PU∨|x|≤ST, which |x|=SU cannot satisfy. Hence, the program would be rightfully rejected. Although the finding is that disjunctions appear to be feasible and definitely provide better precision, there were not sufficient project resources to implement them.

(3.3.6) Constraint Generation: Syntax Directed (element 314)

In this section, it is assumed that all called functions have summaries. For those within the current clique, see Section (3.3.10). For calls via function pointers, see Section (3.3.9).

In addition to the label variables described in Section (3.3.2) for summaries, a number of additional variables are needed.

|var| for SSA variables (just like function parameters).

|b| label variable associated with basic block b (again, b is the label in the IR for the block). This is used for the incoming control taint on block b.

|r, pp| label variable associated with region r and program point pp.

|gl, b| label variables associated with the guard condition of the block b.

These variables are only used for basic blocks that end with conditional branches or resume. The constraints (element 314) on these variables are generated from block terminator instructions.

|exn, b| label variables associated with the label on an exception value thrown by an invoke.

Label variables of this form are only used for basic blocks that have an invoke as their terminator. Note that gl and exn are just tags, mneumonic for "guard level" and "exception level"; in particular the variable name |gl, b| is distinguished from the name |b|.

Several instruction forms have expressions e that may be SSA (static single assignment) variables or literal data values. For simplicity, write |e| even when e is a literal value, but in that case |e| is not a variable; rather consider it to abbreviate the label literal [⊥...⊥].

Write ƒconstraints (@ƒ) to be the summary of a function named @ƒ Recall that DSA tells which functions can be called via a given pointer expression, and their summaries are merged to form a single summary (see Section (3.3.2)). Thus, ƒconstraints (@ƒ) may be from merging several summaries, and those summaries may have been provided by API policy or previously computed. Assume uniform identifiers param for the formal parameters at position i. Additionally, assume that the region identifiers infconstraints (@ƒ) are also in scope at call sites.

(3.3.7) Constraints from Instructions (element 314)

For each instruction in b, at some program point pp, generate constraints as follows.

br label
No constraints.
br e tlabel flabel
|gl,b| = |e|}
x :=phi (e$_0$,l$_0$) ... (e$_n$, l$_n$)

$$|x| = \left( M_{i=20...n} |e_i| \right) t|b|$$

psi(r$_1$ : qq$_{11}$, qq$_{12}$, ... qq$_{1k1}$) ... (r$_m$ : qq$_{m1}$, qq$_{m2}$, ... qq$_{mkm}$)
For each i ∈ 1 ... m, $$|r_i, pp| = \left( M_{j=21...k_i} |r_i, qq_{ij}| \right) t|b|$$

x := op e$_0$ ... e$_n$
|x| = (Π$_{i∈0...n}$ |e$_i$|)
This includes ops like getElemPtr, and the special case x :=e.
x := alloca size
$$|x| = \sqcup_{i∈0...n} |e_i| \sqcup |b|$$
|r, pp| = |b| ⊗ |r,qq|
where r is DSA(x) and qq is lastAssign(r, pp).
x := load e
|x| = |r, qq| t |b|
where r is DSA(e) and qq is lastAssign(r, pp).
store e ptr
|r,pp| = |r,qq| ⊗ (|ptr|t |e|t |b|)

-continued where r is DSA(ptr) and qq is lastAssign(r, pp).
x := call @ f $x_0, x_1 \ldots x_n$ assuming @f is a function name
with existing summary (otherwise see Secs. 3.3.9 and 3.3.10).
Simultaneously, substitute into the summary:
fconstraints(@f) [|$x_0$|/|param$_0$|] . . . [|$x_n$|/|param$_n$|]
           [|x|/|result|]
           [|$r_0$,$qq_0$|/|$r_0$,in|] . . . [|$r_m$,$qq_m$|/|$r_m$,in|]
           [|$r_0$,pp|/|$r_0$,out|] . . . [|$r_m$,pp|/|$r_m$,out|]
           [|b|/|pcinit|]

where $qq_i$ is lastAssign(ry, pp), with i ranging over the indices 0 . . . m for regions.

ret e and resume e

The relevant constraints are defined below, based on the control-flow graph. Note that, although these are block terminator instructions, no gl-variables are defined for them, because the block does not have any successors.

x:=invoke f $x_0, x_1, \ldots x_n$ normlab exnlab

Invokes are like calls, but they can throw an exception. That's why they are branch points and block terminators. Consequently, the constraints generated for invokes are the same as for calls with the addition of a definition of |gl,b| and |exn|.

fconstraints(@F)[|$x_0$|/|param$_0$|] . . . [|$x_n$|/|param$_n$|]

[|x|/|result|]

[|$r_0$,$qq_0$|/|$r_0$,in|] . . . [|$r_m$,$qq_m$|/|$r_m$,in|]

[|$r_0$,pp|/|$r_0$,out|] . . . [|$r_m$,pp|/|$r_m$,out|]

[|b|/|pcinit|]

[|gl,b|/|pcfin|]

[|exn,b|/|except|]

x:=catch $$|x| = \left( M_{pb2preds(b)} |exn, pb| \right) t|b|$$

where preds(b) is the set of predecessors of b.

(3.3.8) Constraint Generation: CFG Driven (Element 314)

For each basic block b, generate a constraint for its implicit flow according to the following:

$$|b| = |pcinit| t(r_{g2nconds(b)}|gl, g|)$$

In addition, $$|result| =_e^{\dot{}} |e| \text{ where } e \text{ ranges over the expressions in instructions } ret e$$

$$|except| =_e^{\dot{}} |e| \text{ where } e \text{ ranges over the instructions resume } e$$

For each relevant region r, $$|r, out| =_{pp2RB}^{\dot{}} |r, pp| \text{ where } RB = \{lastAssgn(r, b) \mid 8b.succ(b) =;\}.$$

$$|pcfin| =_b^{\dot{}} |b| \text{ where } b \text{ ranges over all exit blocks (i.e., those that end with return or resume).}$$

It is assumed that only blocks ending with a return or resume are terminal and have no successors in the control-flow graph. In an embodiment of the invention, pointer policy is also considered for loads/stores, which results in generation of additional enforcement constraints for those instructions. The constraint is simply that the pointer should be trusted, or, if explicit is separate from implicit, the explicit part should be trusted. These constraints are handled similarly to other enforcement constraints, such as those described in section (3.3.7) above.

(3.3.9) Merging Function Summaries for Function Pointers (Element 314)

In Section (3.3.7), generation of constraints is defined for a function call where there is a single summary, already determined. In this subsection, consider the case where DSA determines that more than one function can be reached from a given function pointer, still assuming that the reachable functions already have summaries. Then, subsection (3.3.11) addresses function pointers in combination with mutual recursion.

The idea is simply to form a merge of the relevant summaries. That merged summary is then used to generate constraints according to the rule in Section (3.3.7). Without loss of generality, the case of combining two summaries f and g is considered. They have the same signature, and it is assumed that the summaries refer to the same output regions (for missing ones, add default |r, out|=|r, in|. The merged summary, combining those of and g, is obtained as follows:

For propagation constraints, for each output expression lbxp$_{out}$, merge the constraints lbxp$_{out}$=lbxp0$_{in}$ for f and lbxp$_{out}$=lbxp1$_{in}$ for g as lbxp$_{out}$=lbxp0$_{in} \oplus$lbxp1$_{in}$.

For enforcement constraints, for each input expression, lbxp$_{in}$, if only f (respectively only g) has a constraint for that expression, simply keep the constraint. If both functions have constraints, say lbxp$_{in} \sqsubseteq$labLit0 and lbxp$_{in} \sqsubseteq$labLit1. They are merged as lbxp$_{in} \sqsubseteq$labLit0$\otimes$labLit1. Note that for ceilings of propagation constraints, the results have the form lbxp$_{out}$=lbxp0$_{in} \sqcup$ lbxp1$_{in}$. For ceilings of enforcement constraints, the results have the form lbxp$_{in} \sqsubseteq$labLit0$\sqcap$ labLit1.

(3.3.10) Constraint Generation: Recursion without Function Pointers (Element 314)

Suppose F is a set of one or more functions to be analyzed that comprises a SCC in the call graph (i.e., they make calls to each other). Assume all callees outside F have already been summarized (by analysis or from API policies). The summaries for functions in F are computed simultaneously. As in Section (3.3.7), the generated constraints for call and invoke are not context-sensitive. This section defines how constraint generation is done in this situation, assuming no function calls via function pointers. Section (3.3.11) combines recursion with function pointers. First, use a distinct copy of the constraint variable names for each f in F. For example, if r is a region then instead of |r, in|, |r, in|$_f$ and |r, in|$_g$ assuming F={f, g} is used.

For a call instruction inside function @f at program point pp in block b x:=call @g $x_0, x_1 \ldots x_n$, where @g is in F (i.e., it is a named function (not pointer) and does not already have a summary) generate the following constraints:

$|x|_f$=|result|$_g$

|param$_j$|$_g$=|$x_j$|$_f$ for each j

|pcinit|$_g$=|b|$_f$ $|r_i, \text{in}|_g = |r_i, qq_i|_f$ for each $i$ $|r_i, pp|_f = |r_i, \text{out}|_g$ for each $I$, where $qq_i = \text{lastAssignf}(r_i, pp)$, for each DSA region $r_i$.

Notice that this may introduce multiple equations for a variable, whereas in the case of non-recursive calls (Section 3.3.7), one does not get multiple equations for any variable. The reason is for non-recursive calls substitution is used at each call site, rather than adding new equations at each call site. The invoke instruction should be treated similarly (omitted). As an aside, one can consider an alternative approach to building summaries for mutually recursive functions, by successive approximation. The idea is to build a summary set S for the functions in F as a chain of summary sets $S_i$. For this purpose, an ordering on summaries would be needed. Since the constraints have the same vocabulary, it should be possible to define such an ordering. Next, let $S_0(f)$ be the least summary, for each $f$ Generate $S_{i+1}(f)$ by the usual constraint generation, using $S_i(g)$ for called functions g. Show that this is monotonic with respect to the ordering of summaries. Termination should be clear since the underlying lattice is finite.

(3.3.11) Recursion Together with Function Pointers

The most complicated situation is a call via function pointer, where the possible functions (according to DSA) include some in the clique F under analysis and some that have summaries. The available summaries can be merged, so without loss of generality one can confine attention to the following situation.

Consider a call instruction inside function @$f$ at program point pp in block b x:=call @g $x_0, x_1 \ldots x_n$, where DSA says @g may dispatch to @g0 or @g1 that are in F, and to some other functions for which summaries already exist. Let @h refer to the merge of those summaries. For each DSA region $r_i$, let $qq_i = \text{lastAssign}_f(r_i, pp)$. In general there may be @g0 ... @gk; this case is done for clarity.

The constraints are those of $f$ constraints(@h) together with the following:

$|x|_f = |\text{result}|_{g0} \oplus |\text{result}|_{g1} \oplus |\text{result}|_h$ $|\text{param}_j|_{g0} = |x_j|_f$ and $|\text{param}_j|_{g1} = |x_j|_f$ and
$|\text{param}_j|_h = |x_j|_f$ for each $j$ $|\text{pcinit}|_{g0} = |b|_f$ and $|\text{pcinit}|_{g1} = |b|_f$ and $|\text{pcinit}|_h = |b|_f$ $|r_i, \text{in}|_{g0} = |r_i, qq_i|_f$ and $|r_i, \text{in}|_{g1} = |r_i, qq_i|_f$ and $|r_i, \text{in}|_h = |r_i, qq_i|_f$ for each $i$ $|r_i, pp|_f = |r_i, qq_i| \oplus |r_i, \text{out}|_{g0} \oplus |r_i, \text{out}|_{g1} \oplus |r_i, \text{out}|_h$ for each $i$ The constraints of $f$ constraints(@h) should be renamed to use the h tag as in the other constraints.

(3.4) Simplifying Propagation Constraints (Element 316)

Given the set of drafted equational and inequational constraints (element 318) as described above, a summary can be produced. First, the equational constraints are reduced to two sets of level constraints, the ceilings and the floors. Second, the ceilings and the floors are, separately, processed by the algorithm described below. Finally, inequational constraints are processed as described in section (3.5). The result of simplifying propagation constraints (element 316) is simplified propagation constraints (element 320) and draft enforcement constraints (element 322).

(3.4.1) Simplification of Propagation Constraints

Let ES be a set of equational constraints on levels. For the moment, assume that ES has the form obtained when there are no recursive functions (i.e., for each variable there is at most one equation with that variable on the left). For that special case, the following algorithm constructs a set of equations EQ that is a substitution (i.e., each left-hand side is a variable, and none of those variables occurs on a right-hand side of an equation in EQ).

```
procedure SIMPLIFYCONSTRAINTS(ES)
  EQ ← empty                        - a constraint set
  while ¬ empty(ES) do
    (var = cexp) ← deq(ES)          - choose and remove an equation
    cexp0 ← applySubst(EQ, cexp)
    cexp1 ← eliminate(var, cexp0)   - see "cycle breaking" below
    EQ ← applySubst((var = cexp1),EQ)
    EQ ← EQ + (var = cexp1)
  end while
  return EQ
end procedure
```

Upon termination, only input variables occur on the right sides of equations in EQ. This is because it is invariant that EQ is a substitution, and all other variables occur on the left of equations. Most importantly, the constraints imposed by EQ are the same as those imposed by the initial constraints in ES. The equational part of the function summary consists of the equations for output variables. The other equations are retained, for processing the inequations.

(3.4.2) Cycle Breaking and its Optimality

Although SimplifyConstraints resembles a unification algorithm, it does not have an 'occurs check' and it never fails. Instead, a cyclic equation is replaced by a suitable non-cyclic one. For ceiling constraints, where joins but not meets occur, the general form of a cyclic equation is $|x| = |x| \sqcup \text{cexp}$ where $|x|$ does not occur in cexp. This is equivalent to $\text{cexp} \leq |x|$. The least solution of this inequality for $|x|$, which is appropriate for ceiling constraints, is $|x| = \text{cexp}$.

For ceilings, a cycle $|x| = |x| \text{cexp}$ is eliminated, where $|x|$ does not occur in cexp, by replacing $|x| = |x| \sqcup \text{cexp}$ with $|x| = \text{cexp}$. For floors, which can have both meets and joins, it is more complicated. Because it is assumed that the lattice is distributive, one can convert all meet-join expressions to join normal form (JNF) (i.e., a join of meets over variables and literal lattice elements). Therefore, without loss of generality one can assume the equation has the following form:

$$|x| = \text{cexp} \sqcup (|x| \sqcup \text{mexp}_1) \sqcup \ldots \sqcup (|x| \sqcap \text{mexp}_k), \quad (1)$$

where cexp is a join of meet terms that do not contain $|x|$ and each $\text{mexp}_i$ is a meet term that does contain $|x|$. For this purpose, a meet term is a meet of variables, or else simply $\top$, since one can simplify $\bot \sqcap \text{mexp} = \bot$ and $\top \sqcap \text{mexp} = \text{mexp}$. The least solution is $|x| = \text{cexp}$. One can use absorption to show it's a solution and use properties of joins to show that it is least. However, for floors, the greatest solution is desired.

Proposition: The greatest solution of (1) is $$|x| = \text{cexp} \sqcup (\text{mexp}_1 \sqcap \ldots \sqcap \text{mexp}_k) \quad (2)$$

In the special case that some $\text{mexp}_i$ is $\top$ (i.e., $|x|$ occurs on its own in one of the terms of (1), one can simplify (2) by dropping the term $\text{mexp}_i$. The conclusion is that for the floor solution of a cyclic equation, put it into the equivalent form (1) and replace it by (2). In summary, eliminate is defined by cases on ceilings and floors, respectively, according to the following:

eliminate($|x|,|x| \sqcup cexp$)=($|x|=cexp$)

eliminate($|x|,c \exp \sqcup (|x| \sqcap m \exp1) \sqcup \ldots \sqcup (|x| \sqcap m \exp_k)$)=($|x|=c \exp \sqcup (m \exp_1 \sqcap \ldots \sqcap m \exp_k)$).

Proof of proposition (in the case of k=2 for clarity):
First, (2) is a solution of (1) because:

$cexp \sqcup ((cexp \sqcup mexp_1 \sqcup mexp_2) \sqcap mexp_1) \sqcup ((cexp \sqcup mexp_1 \sqcup mexp_2) \sqcap mexp_2)$=by distributivity and $\sqcap$ idempotent $cexp \sqcup (cexp \sqcap mexp_1) \sqcup mexp_1 \sqcup (mexp_2 \sqcap mexp_1) \sqcup (cexp \sqcap mexp_2) \sqcup (mexp_1 \sqcap mexp_2) \sqcup mexp_2$=by absorption several times $cexp \sqcup mexp_1 \sqcup (cexp \sqcap mexp_2) \sqcup mexp_2$=by absorption $cexp \sqcup mexp_1 \sqcup mexp_2$.

Second, to show (2) is the greatest solution, suppose $|x|$ is a solution. To show $|x| \leq cexp \sqcup mexp_1 \sqcup mexp_2$ it suffices to show $cexp \sqcup (|x| \sqcap \exp_1) \sqcup \ldots \sqcup (|x| \sqcap mexp_k) \leq cexp \sqcup mexp_1 \sqcup mexp_2$ since $|x|$ satisfies (1). Since $\sqcup$ is monotonic, this follows from the conjunction of $cexp \sqsubseteq cexp$, $(|x| \sqcap mexp_1) \leq mexp_1$, and $(|x| \sqcap mexp_2) \leq mexp_2$. These are all true by lattice properties.

(3.4.3) Simplification in the Presence of Recursive Functions

In the case of recursion, the generation process leads to multiple constraints with the same LHS variable, contrary to the temporary assumption made above. In that case, the algorithm produces equations that have non-variable expressions on the left, so instead of terminating because ES becomes empty, it gets stuck once there is no equation remaining of the form var=cexp.

In a purely syntactic unification algorithm, an equation like exp0*exp1=exp2+exp3 is handled by checking whether *=+(i.e., same term structure), failing if not, and otherwise producing new equations exp0=exp2 and exp1=exp3. Here, the aim is for something like unification modulo lattice equations. Although there are extensive results about unification modulo various algebraic properties (associativity, commutativity, idempotence, distributivity, etc.), most algorithms have high complexity as well as being complicated to implement. A good general reference is the handbook chapter (see Literature Reference No. 9; see also Literature Reference No. 27).

As an alternative, there is the following procedure which solves the problem in many cases.
1. Perform straightforward algebraic simplifications
2. Put left sides into equivalent canonical form:
   put into join normal form (JNF)
   remove duplicates (sound, by idempotence)
   sort, based on some ordering (say alphabetical) of variables
3. Perform the quasi-unification algorithm, and in the case where both sides are non-variable, treat as in syntactic unification, reporting failure if the topmost operators do not match.

More precisely, the quasi-unification algorithm looks as follows:
procedure SIMPLIFYCONSTRAINTSREC(ES)
  EQ←empty
  while¬empty(ES) do
    E→deq(ES)
    if E has form (var=cexp) or (cexp=var) then
      cexp0←applySubst(EQ, cexp)
      cexp1←eliminate(var, cexp0)
      EQ←applySubst((var=cexp1),EQ)
      EQ←EQ+(var=cexp1)
    else
      if E has the form ce0•ce1=ce2•ce3 where • is $\sqcap$ or $\sqcup$ then
        EQ←EQ+(ce0=ce2)+(ce1=ce3)
      else
        discard and make note of partial failure
      end if
    end if
  end while
  return EQ
end procedure Partial failure only occurs with floors, which may have meets in addition to joins. At this point in the process the failure need not be reported. That happens during consistency checking (section (3.6)).

(3.5) Merging Enforcement Constraints (Element 324)

As depicted in FIG. 3B, for each function in the current SCC (clique) having draft enforcement constraints (element 322), a function body (i.e., a list of instructions) (element 323), and simplified propagation constraints (element 320), the enforcement constraints need to be merged (Section (3.5.2)) taking into account control structure as explained in Section (3.5.1) below.

(3.5.1) Inequational (Enforcement) Constraints and Control Structure

Consider the following example pseudocode, where fPT is some function with policy that its parameter is ≤PT.
  if (whatever)
    y:=call fPT(x)
  else
    skip For the example code, the ceiling constraint should be $|x| \leq PT$. However, since there is a path that does not make the call, there should be no floor constraint. Equivalently, the floor constraint should be $|x| \leq SU$. Hence, ideally, one would like to end up with the label constraint $|x| \sqsubseteq [SU..PT]$. Notice that [SU..PT] does not have the interval property.

As another example consider:
  if (whatever)
    y:=call fPT(x)
  else
    z:=call gST(x),
where the parameter policy for gST is ST. Here, the aim is for $|x| \sqsubseteq [ST..PT]$, because in the worst case x is passed to fPT but in the best case gST with the less restrictive policy. This suggests that for constraints generated on alternate control paths of the form $|x| \sqsubseteq [l..u]$ and $|x| \sqsubseteq [l'..u']$, combine them as $|x| \sqsubseteq [l \sqcup l'..u \sqcap u']$. That is, combine using the dual merge operator: $[l..u] \otimes [l'..u']=[l \sqcup l'..u \sqcap u']$. This is called "parallel merging". This form of combination works in general, for alternate control paths, as long as x has an inequation on both paths. If not, this can be achieved by fiat, by adding the vacuous constraint $|x| \leq [\top..\top]$. In the example, the skip path gets constraint $|x| \sqsubseteq [SU..SU]$ and then one gets [PT $\sqcup$ SU .. PT $\sqcap$ SU], which simplifies to [SU..PT].

Another example is the following:
y:=fPU(x); z:=gST(x)
Here there are no alternate paths. Both constraints $|x| \leq PU$ and $|x| \leq ST$ will need to be imposed at run-time and, hence, should also be imposed statically. By lattice property, this is the same as the single constraint $|x| \leq PU \sqcap ST$ (i.e., $|x| \leq PT$). This is called "sequential merging".

For monitoring, it may be better to check at the call site rather than have the callee check its policy, because the caller can combine checks. To achieve soundness for ceilings and reasonable precision for floors, inequational constraints need to be merged according to whether they are in alternate control paths or not. Note that inequational constraints are generated for instructions call and invoke, and also load/store if using the pointer policy.

Combining inequational constraints "in sequence" is straightforward and is a safe, if imprecise, default: any two constraints merged "in parallel" would imply the sequential merge of the same (by properties of lattice operations). Combining them "in parallel" is not. A naive approach would be to combine the constraints as they are generated. Those constraints may apply to intermediate variables. However, that would rarely be precise. Consider the following example:

if (u)
   y:=call fPT(x)
else
   w:=x;
   z:=call gST(w)

The muLLVM IR looks as follows:

```
entry:      br u th el
th:         y = call fPT x
            br out
el:         w = x
            y = call gST w
            br out
out: . . .
```

The generated constraints include $|x| \sqsubseteq PT$ and $|w| \sqsubseteq ST$. The constraints cannot be merged since they refer to different variables. Thus, simplified propagation constraints must be substituted into enforcement constraints (element 326), resulting in located enforcement constraints (element 328). After substituting the solved equation for $|w|$, the constraint $|x| \sqsubseteq ST$ arises, at which point it is evident that it needs to be combined with $|x| \sqsubseteq PT$ However, now the information needed to determine that one can merge them in parallel is lost, so they have to be merged in sequence, obtaining the least precise $|x| \sqsubseteq [PT..PT]$ as opposed to $|x| \sqsubseteq [ST..PT]$.

One way to achieve more precise summary for inequational constraints is to rewrite inequational constraints to in equations on inputs label variable, but retain the program points they originated from to be able to decide whether they can be combined in parallel. The latter is probably needed anyway, in order to provide useful diagnostics. In this disclosure, the second, more sophisticated approach is followed. After applying the substitution, there could potentially be several inequational constraints for each input and no way of knowing whether all these constraints apply to the same run or not. If one retains the program points the constraint originated from, one could reason about constraints in alternate execution paths based on their relative position in the control-flow graph (in "series" or "parallel") and, thus, combine them in a way that would account for the various possibilities.

(3.5.2) Merging Inequational Constraints

The method according to embodiments of the present disclosure provides a solution for the problem with enforcement constraints that can have meets on the left-hand side.

Let IG be the generated inequational constraints for the function. Let IC be the inequational constraints obtained by applying the substitution (element 326) EQ from Section (3.6.2) to IG. Their ceilings provide a sound summary. The floors should be refined, as described in the previous section, in order to obtain a tighter approximation of best-case behavior.

The algorithm is defined in terms of labels and $\otimes$, for clarity. However, since its use is for floors, it can be implemented by first separating floors from ceilings; then the following would be applied only to floors.

Given: The function's control-flow graph G and the located constraints (element 328), LCS: $b \rightarrow \mathcal{P}$ (IC). The idea is that LCS(b) is a set of enforcement constraints that originated (before applying the substitution EQ) in block b.

Output: the set IS of constraints for the summary, which are a weakening of IC that takes into account the point in control flow where the constraint arose.

Enforcement constraint merging is formulated as a backwards data-flow problem. Let Var be the set of input label-variables for the function.

Define:

The DFA domain is the set $\{D | D \in \mathcal{P}(\text{Var}) \rightarrow \mathcal{L}\}$, elements of which will be called constraint bundles and are ordered pointwise.

The lifted meet and join $D_1 \sqcap D_2 = \lambda xs.D_1(xs) \sqcap D_2(xs)$
$D_1 \sqcup D_2 = \lambda xs.D_1(xs) \sqcup D_2(xs)$ $\uparrow - \uparrow \in \mathcal{P}(IC) \rightarrow D$ is a lifting operator: it converts a constraint set to a constraint bundle:

$\leftarrow ics \leftarrow = \lambda xs. \sqcap \{L | (xs \leq L) \in ics\}$.

This means that constraint bundles are defined for all xs. As usual, the meet of the empty set is top. So, if there are no constraints for xs, the value of $\uparrow ics \uparrow$ (xs) is T.

Following standard practice, the analysis is defined using two functions, where b is a block:

transfer(b,D)=D $\sqcap$ T LCS(b)$\leftarrow$, the block transfer function,
join($D_1,D_2$)=$D_1 \sqcup D_2$, the predecessor join function.

These two functions and the domain description is enough to specify and run a standard DFA. The DFA is backwards, and the merged constraints are going to be the final constraint bundle for the entry block.

Algorithm: Using sets that can be enumerated over, queues with empty, enq (enqueue), and deq (dequeue) operations, maps with lookup (•(•)), insertion/update (•(•)•) key membership test (•∈•) operations, set union (•∪•) operations as well as operations on the control-flow graph: exitNodes, preds, succs, entryNode.

Constraint bundles are represented by maps, using T as default value for elements not in the domain of the map.

```
procedure MERGECONSTRAINTS(LCS, G)
    OUT       -A map from block IDs to constraint bundles
    worklist  -The queue of block IDs for processing
    enq(worklist, exitNodes(G))
    while ¬ empty(worklist) do
        n ← deq(worklist)
        oldout ← OUT(n)
        in ← ⊥
        for all p ∈ succ(n,G) do
            in ← join(in, OUT(p))
        end for
        OUT(n) ← meet(in, lift(LCS(b)))
        if oldout ≠ OUT(n) then
            enq(worklist, preds(n,G))
        end if
    end while
    return OUT(entryNode(G))
end procedure
procedure meet(D₁, D₂)
    D ← ∅
```

-continued

```
    for all vs ∈ D₁,D₂ do
        D(vs) ← lookupWithDefault(D₁, vs) ⊓ lookupWithDefault(D₂, vs)
    end for
    return D
end procedure
procedure join(D₁, D₂)
    D ← ∅
    for all vs ∈ D₁,D₂ do
        D(vs) ← lookupWithDefault(D₁, vs) ⊔ lookupWithDefault(D₂, vs)
    end for
    return D
end procedure
procedure lift(ics)
    D ← ∅
    for all (v₁ ⊓ v₂ ⊓ ... ⊓ vₙ ≤ L) ∈ ics do
        vs ← (v₁, v₂, ..., vₙ)
        if vs ∈ D then
            D (vs) ← D(vs) ⊓ L
        else
            D (vs) ← L
        end if
    end for
    return D
end procedure
procedure lookupWithDefault(D, x)
    if x ∈ D then
        return D(x)
    else
        return T
    end if
end procedure
```

Looser approximations of best-case behavior can be obtained simply by retaining some constraints un-merged. These are then combined using ⊓ as if they were in series.

(3.6) Checking Constraints and Producing Summaries

Once constraints have been simplified (element 330) and merged (element 332), they need to be checked for consistency (section (3.6.1)). If the ceilings are consistent, the given set of functions is secure, and function summaries can be produced (section (3.6.2)). If the ceilings are inconsistent, the inconsistency can be diagnosed and used to guide inlining (section (3.7)).

A set of constraints on level expressions is consistent if there is an assignment of levels to level variables that satisfies all the constraints. The interest is the set of ceiling, respectively floor, and constraints for a function summary. If the ceilings are consistent, the program is statically proved secure. If the ceilings are inconsistent but the floors consistent, it is called a soft inconsistency; monitoring may then allow some secure executions. If the floors are inconsistent too, it is a hard inconsistency.

Recall that the equational constraints of a summary are in the form outputVar=inputExpression and inputExpression 9 literal. The equational constraints are always satisfiable (e.g., by assigning bottom to all variables). Moreover, the equations have no bearing on satisfiability of the inequational constraints.

In the following, only the inequational (enforcement) constraints are considered. The overall process goes as follows.

Step 1: Given the set of enforcement constraints on labels, for a function summary, generate the sets Ceil and Floor as follows. Let Ceil be the images under ⌈-⌉ of the constraints, and Floor be the images under ⌊-⌋ (see section (3.3.4)). As part of this, keep track that each ceiling constraint, for instance [lxbp]≤u, has a corresponding floor constraint [lxbp]≤l (for levels u, l). As per section (3.5.2), this may be done by locating constraints at blocks or program points.

Step 2: Check Ceil for consistency (details below). If consistent, the function is secure. Otherwise, proceed.

Step 3: The only way Ceil can be inconsistent is if it contains a constraint l≤l' with literal l on the left which evaluates to false. Let Ceil' be the set of false constraints. If there was a partial failure during simplification (section (3.4.1)), one must declare a hard inconsistency and report that it may be be due to approximate unification. Otherwise, let Floor' be the floor constraints that correspond to those in Ceil' (tracked in Step 1 above), and proceed.

Step 4: Check Floor' for consistency. If it is consistent then monitoring may help—this is dubbed a soft inconsistency. Otherwise, the original constraints have a hard inconsistency. For a soft inconsistency, there will be a warning but the code can be monitored; the locations that affect the labels of variables involved in Floor' need to be instrumented.

Step 5: For a function with consistent ceilings, or soft inconsistency, a summary is obtained by discarding the constraints with just a literal on the left side.

A set of constraints on level expressions is consistent if there is an assignment of levels to level variables that satisfies all the constraints. The interest here is in the set of ceiling, respectively floor, constraints for a function summary. If the ceilings are consistent, the program is statically proved secure. If the ceilings are inconsistent but the floors consistent, it is called a soft inconsistency; monitoring may then allow some secure executions. If the floors are inconsistent too, it is a hard inconsistency.

(3.6.1) Checking Consistency of Enforcement Constraints (element 334)

The problem is as follows. Given a computable distributive lattice $\mathcal{L}$ of levels (specifically, means to compute ≤, ⊔, ⊓ on level literals); and a set C of constraints of the form lexp≤litlev, where litlev is in $\mathcal{L}$ and lexp is an expression in level variables, literals, and the operations ⊔,⊓. A decision needs to be made whether there is an assignment of levels to variables such that the constraints all evaluate to true. Owing to the simple form there is a straightforward algorithm for checking consistency.

1. Put each constraint in C into JNF (this relies on distributivity).
2. Repeatedly split joins, replacing a constraint $lexp_0$ ⊔ $lexp_1$≤litlev by the two constraints $lexp_0$≤litlev and $lexp_1$≤litlev. This transforms C to a set of constraints lexp≤litlev where lexp is a meet of variables and literals, and C is equivalent to the original constraint set.
3. For any lexp≤l in C such that lexp contains a variable, the constraint is satisfiable (by setting the variables to ⊥, since ⊥ is the zero element of ⊓) so remove the constraint from C.
4. The remaining constraints have the form lexp≤l, where lexp is a meet of literals. This can be evaluated in the lattice $\mathcal{L}$.

For simple lattices like the leading example, direct implementation of step 4 is straightforward. For complicated lattices, one implementation technique is to encode using bitvectors, using an SMT solver using bv-and for meet. Join is represented by bv-or. An inequation lexp≤litlev is translated as the equation lexp⊔ litlev=litlev. Section (3.9) describes how it is done, using an example that has been confirmed using the Z3 SMT (Satisfiability Modulo Theories) solver. In fact, it shows that satisfying assignments can be found for expressions with variables.

For use with ceiling constraints, the goal is also to track the corresponding floor constraints. Therefore, when splitting joins and doing other manipulations, a constraint identifier should be associated with the derived constraints so they can be traced back to the corresponding floor constraint (which in general may be different, owing to merges).

(3.6.2) Producing Summaries

There are now all the ingredients to produce summaries for all the functions in the current clique F, by the following steps:
1. Generate equational and inequational constraints (section (3.3)), with attached program points in the case of inequational.
2. Solve and simplify the equational constraints (section (3.4).
3. Apply the resulting substitution to the inequational constraints.
4. Merge the resulting in equations (section (3.5)).
5. For each function $f$ in F, check consistency and if consistent (element 336), filter out the constraints on its inputs and outputs, from the simplified equational constraints and the merged inequations (element 338).

In the case of hard inconsistency (element 340) there is no summary, and the program is rejected (element 341). In the case of soft inconsistency (element 342), the summarization step 5 is performed according to section (3.7.4).

(3.7) Inlining (element 344)

This section describes the inlining transformation, which is applied to a function body (element 346) for which the constraints have a soft inconsistency (element 342).

(3.7.1) Overall Structure of Instrumentation

Transformations via a transfer function (element 343) are guided by the simplified propagation constraints ($\mathcal{P}_S$), the original (non-simplified) propagation constraints ($\mathcal{P}$) for the function as well as the soft inconsistencies in the enforcement constraints ($\varepsilon$). To determine where inlining should be done the original constraints are sliced, so that only the constraints that talk about flows causing soft-inconsistencies are included (i.e., extract inconsistent set 348), resulting in a set of inconsistent constraints (element 350) and consistent constraints (element 352). Additionally, partial folding is done for the propagation constraints that are fixed to literal levels in simplified constraints. After slicing, a set of inlining constraints is obtained, which tells one how to instrument the code.

Inlining enforcement constraints: Let $\varepsilon_I$ be the subset $\varepsilon_I \subseteq \varepsilon$ of enforcement constraints that have soft inconsistencies in them so that $\varepsilon \backslash \varepsilon_I$ is consistent.

Inlining propagation constraints: Let $\mathcal{P}_I$ be derived from the original propagation constraints as follows.
1. Let $\alpha$ be the substitution $\{x=lit|(x=lit)\in \mathcal{P}_S\}$.
2. Let $\mathcal{P}_0$ be the image of $\mathcal{P}$ under $\alpha$.
3. Let $\mathcal{P}_1$ be the subset $\{x=lexp|(x=lexp)\in \mathcal{P}_0$ and $x \notin dom(\alpha)\}$. (i.e. keep only the equations with non-literal right sides)
4. Let $\mathcal{P}_2$ be the subset $\{x=lexp|(x=lexp)\in \mathcal{P}_1$ and $\exists (lexp' \leq lit) \in \varepsilon_1 \cdot x \in lexp'\}$ (i.e., keep only the equations for variables in enforcement constraints in the soft inconsistency).
5. Let $\mathcal{P}_I$ be the fixpoint of $f$ applied to $\mathcal{P}_2$ where $f$ is defined by:

$f(Q)=Q \cup \{y=lexp|\exists (z=lexp')\in Q \cdot (y=lexp)\in \mathcal{P}_1$ and $y \in lexp'\}$.

Function bodies are transformed according to instruction-level and block-level rules (section (3.7.3)). Their signatures are transformed according to the table depicted in FIG. 4.

(3.7.2) Preprocessing (element 354)

As an optional optimization, the enforcement constraints to be inlined can be simplified according to subsumption. For example, if a straight line code checks $|x| \leq L$ and then $|x| \leq L'$, the second check can be omitted if $L \leq L'$. This could be accomplished by a forward dataflow analysis where the domain is a set of located constraints. When you traverse a block, add the located constraints in that block, except for those already implied by the current constraints. Flow-sensitive refinement of inconsistent constraints (element 354) results in refined inconsistent constraints (element 356) and consistent constraints (element 358).

(3.7.3) Instruction Level and Block Level Instrumentation Transformations

Block-level rules are presented in FIG. 4. Given characteristics of a basic block (such as the number of predecessors and/or successors) and assumptions about inlining constraints, it tells which instructions should be inserted at the beginning of the block (the block foreword). Rules refer to the current block as b. All rules maintain an implicit mapping, that maps constraint variables to corresponding fresh local or global (in case of regions) variables, such that:

%|r, in|, %|r, out|, %|r, pp|, %|x| are fresh locals (in the function scope)

@|r|,@|pcinit|, @|pfin|, @|exn|, @|result| are fresh globals (in the global scope)

Additionally, the function impl(e) produces code that implements lattice operations.

Instruction-level rules are presented in the table depicted in FIGS. 5A-5B. Given an original instruction and assumptions about inlining constraints, it tells the instructions (if any) to insert before the original instruction. Here, b is the block the instruction is in. The definitions of impl and check depend on how labels are implemented. One implementation is based on encoding lattice elements as 32-bit vectors (which requires the underlying security lattice to be a free lattice). An implementation of u is bitwise-OR and $\leq$ is bitwise implication. The emit function inserts its argument, an instruction, before the current instruction.

impl(L)=L impl(L)=%x impl(e1 ⊔ e2)=x; emit(x:=or impl(e1), impl(e2)),x fresh check(x, l)=or nx, l; emit(nx:=xor n, 0xFFFFFF In the present disclosure, it is proposed that policy failure be signaled with call to a function. That function might stop the execution, or just log the event for testing. There are extra considerations if the failure signaling function throws an exception. First, it will modify the control-flow graph (the previous transformation doesn't do that), so extra care must be taken for the analyses and transformations to consider the original control-flow graph and control-dependence relations. Second, those exceptions should not be handled by the user code (see Literature Reference Nos. 3 and 14). Hence, all resume blocks should be modified to bypass the original handling code in case the exception has been thrown by the stop function.

(3.7.4) Summaries for Inlined Functions (element 360)

For a function that has been inlined, the summary differs in two ways from those described above. First, it should be marked as an inlined function, to indicate that callers need to provide labels as additional parameters (FIG. 4). Second, the summary is comprised of only the consistent constraints (both enforcement and propagation), since the potentially-inconsistent ones are going to be checked and tracked at runtime.

(3.7.5) Protection of the Monitor State

Corruption of the monitor state is one of the distinct threats that are specific to inlined monitors. All because the monitor is intertwined with the program being monitored and they share the state space. LLVM is inherently not memory-safe; the program can access arbitrary locations in its address space. If memory access is not restricted, a malicious monitored program can use it to corrupt the state of the monitor: the label variables and the bodies and references to auxiliary functions.

In order to address that problem, type and memory safety is enforced using the Automatic Pool Allocation transformation (see Literature Reference No. 16). It was originally designed for optimizing heap allocations, but the side benefit is that it can prevent access outside the memory region corresponding to the type of the pointer, and it can do so efficiently. In addition, it relies on the Data-Structure analysis described above in section (3.2), so it fits right in the tool chain according to embodiments of the present disclosure.

Automatic Pool Allocation analyzes the program and infers structural types of memory regions. Then, memory allocation sites are transformed to allocate from a specific pool for this type. Pointers obtained from these allocations are restricted to the pool's memory region at run-time. This also applies to global variables.

In order to protect the integrity of the monitor, it is ensured that the memory the underlying program can refer to is disjoint from that of the monitor state. This is done in two parts: (1) ensure that the local and global variables used by the monitor are distinct from those of the program, since the lexical scope of all functions is known statically (this is possible to guarantee at compile-time); and (2) ensure that pointers in the original are confined only to the original program's memory; this is done by performing the Automatic Pool Allocation transformation before analysis and inlining. Analysis can then reuse the DSA from PoolAlloc.

(3.8) Discussion

(3.8.1) Multithreading

Concurrency gives rise to additional information channels. Races on shared memory could allow two threads, deemed secure in isolation, to leak information when reads and writes to memory are interleaved. Further, timing of input/output (IO) operations of threads relative to those of the others can also communicate information.

There has been work on static analysis, transformation and monitoring that take these channels into account. Recently, Askarov et al. (see Literature Reference No. 1) have shown how to extend a hybrid monitor (see Literature Reference Nos. 17 and 23) to track flows in a simple language with barrier synchronization primitives and dynamically configurable shared memory. Note that it has been shown how a hybrid monitor (without multithreading support) can be inlined (see Literature Reference No. 11). It is plausible that it is possible to inline the monitor (see Literature Reference No. 1) as well. The approach described herein could, therefore, be extended to handle multithreading.

(3.8.2) Proof-Carrying Code

There are several possible variations for proof certificates that can be checked by code consumers. For code with no inlined instrumentation, a compact form of certificate is the function summaries. There are two ways these can be checked by a code consumer. The first is to re-generate the constraints (but do not solve/simplify) and check that the constraints on inputs/outputs are implied by the summary constraints. The second is to use a typechecker to check the summaries. For the second way, summaries could be augmented with constraints at loop cut points, so the typechecker would have less inference to do.

For code with inlined instrumentation, the certificate should also designate which instructions are instrumentation, or at least designate which are the shadow variables. Slicing from those variables gives the instrumentation, which is independent from the underlying code. The non-instrumentation code is then typechecked against summaries, while treating level checks in the instrumentation like downgrading operators in type systems with downgrading (see Literature Reference No. 26).

(3.8.3) Soundness

Establishing a detailed proof of soundness is beyond the scope of this disclosure; however, there is a clear path by which the analysis and inlining process could be proved correct. First, consider downgrading policy specified by intermediate assumptions. The intended semantics can be defined in terms of epistemic logic (see Literature Reference Nos. 2 and 7). Previous results in this project, published in CSF 2014 (see Literature Reference No. 10), shows how dynamic monitoring can enforce the policies by tracking assumptions (see also Literature Reference No. 4). However, this feature is not currently being implemented. What remains are policies expressed by means of function preconditions (enforcement constraints), which encode both output checks (for functions that produce output) and inter-component checks; and function postconditions which encode policy for external inputs.

Consider the program semantics to be a trace of the calls of policy relevant functions. Each of these calls designates the label for an input or the check guarding an output. Thus, the noninterference property can be stated as follows.

For any security level l, and any two traces T,T' of the program, if (a) for any input function f with return level≤l, the ith call of $f$ in T returns the same result as the ith call of $f$ in T' then (b) for any output function g with precondition level≤l, the ith call of $f$ in T returns the same result as the ith call of $f$ in T'

To state the property formally, a formalization of LLVM semantics is needed. For formalization of LLVM, one could build on the Vellum project and also the new DeepSpec project. To verify protection of the monitor using SAFEcode, one could leverage prior verification of its type system (see Literature Reference No. 15).

If a program is accepted by the static analysis, it is secure. The proof can proceed in three steps. First, if the constraints are consistent, a flow-sensitive labeling of DSA regions and program variables is obtained, together with function summaries. Second, a flow-sensitive type system is defined, and it is shown that the solved constraints and function summaries are accepted by the type system. Third, it is proven that the type system ensures security (using standard techniques (see Literature Reference Nos. 6 and 21).

Previous work on correctness of inlining monitors (see Literature Reference Nos. 11 and 25) has proceeded in two steps. First, formalize an idealized monitor that runs in parallel with the original program, and show that it enforces security. Second, show that the inlined program bisimulates the original program under the idealized monitor. The particular notion of bisimilarity needs to take into account that the inlined program takes many extra steps compared with the original program.

This approach should scale to more complex inlined monitors, such as that described in Literature Reference No. 12). By contrast, the approach according to embodiments of the present disclosure is based on first statically analyzing the program, and then directly producing the inlined monitor. Therefore, the proof technique needs to be somewhat different. Here is one approach.

1. Define a non-inlined idealized monitor that tracks dynamic labels everywhere, while checking that they are consistent with the statically inferred labels.
2. Show that the idealized monitor enforces noninterference.
3. Show that the idealized monitor never signals security fault except in code that is designated to be monitored.
4. Show that for any inlined subprogram, the behavior is the same as running the idealized monitor on that subprogram. (This step is like what is done in prior work.)
5. Deduce that running the selectively inlined code has the same behavior as running the idealized monitor on the entire program.
6. Conclude from items 2 and 5 that the selectively monitored code is secure.

(3.9) Example of Solving Constraints Using SMT

```
; Encoding of the 4-point lattice using bitvectors, in smt-lib2
; One solver invocation which has been tested:
; z3-smt2-in
Use bitvectors and define the 4-point lattice
(set-logic QF BV); quantifier-free formulas using bitvector theory
(define-sort Lat ( ) (BitVec 2)); Lat abbreviates length 2 bitvectors
(define-fun PT ( ) Lat # b00); name the lattice elements
(define-fun PU ( ) Lat # b01)
(define-fun ST ( ) Lat # b10)
(define-fun SU ( ) Lat # b11)
(define-fun join ((x Lat)(y Lat)) Lat (bvor x y))
(define-fun meet ((x Lat)(y Lat)) Lat (bvand x y))
(define-fun latLeq ((x Lat)(y Lat)) Bool
    (=y (join x y))); note: bvult is integer lt
; Declare some variables
(declare-fun v1 ( ) Lat)
(declare-fun v2 ( ) Lat)
(declare-fun v3 ( ) Lat)
(declare-fun b1 ( ) Bool)
(declare-fun b2 (Bool)
(declare-fun b3 (Bool)
; sanity checks
(push 1)
(assert (=v1 (join PU ST)))
(assert (=v2 (meet PU ST)))
(check-sat)
(get-value (v1 v2)); should be SU, PT i.e. # b11 # b00
(pop 1)
; sanity checks
(push 1)
(assert (=b1 (latLeq PT PU)))
(assert (=b2 (latLeq SU PT)))
(assert (=b3 (latLeq SU SU)))
(check-sat)
(get-value (b1 b2 b3)); should be True, False, True
(pop 1)
; solve satisfiable constraints
(push 1)
(assert (latLeq v1 v2))
(assert (latLeq v2 PU))
(check-sat)
(get-value (v1 v2))
(pop 1)
; check unsatisfiable constraints
(push 1)
(assert (latLeq ST PU))
(assert (latLeq v2 PU))
(check-sat)
(pop 1)
```

In summary, this invention enables enforcing of information security policies with better precision than current static methods and less run-time overhead than current run-time methods. In addition, this approach is compatible with existing compiler toolchains (such as the LLVM toolchain), making it possible to seamlessly integrate this approach with the state-of-the-art development environments. Transforming the original software relies on software analysis to determine whether any run-time checks normally inserted into the original software can be safely omitted, because a portion of the transformed software (transformed function, element 362) cannot be executed in a manner inconsistent with the predefined policy. Typically, software analysis inserts a run-time check, and if the run-time check determines that the current execution is inconsistent with the policy, then corrective action is taken (e.g., print error and abort). In the system described herein, first, a determination is made regarding whether such inconsistency is possible. If possible, then the process proceeds with inserting a run-time check. If it is determined that such an inconsistency is not possible, that is, software analysis is not capable of being executed in a way that would violate the policy (be inconsistent with it), then there is no reason to insert a run-time check. Thus, insertion of run-time checks will be kept to minimum. Transforming the original software reduces the number of checks inserted, therefore, it significantly reduces the overhead related to having to perform the inserted checks.

Information flow policies allow capturing a large class of security concepts (a significant majority of the commonly recognized top software vulnerability classes are a form of information flow policy violations). Overall, secure information flow can serve as an important foundation for future software systems. The hybrid information flow approach according to embodiments of this disclosure is particularly applicable to systems with large software supply chains or open architectures supporting user-installable programs.

The technique can improve software development and reduce development, testing, and integration costs by identifying security flaws early in the development process. Additionally, the system described herein allows for checking and improving security software. Security software is used, for instance, for isolation or quarantine of files infected by a computer virus on a computer's hard disk, or deactivation of a physical system, change in operation of a router, email server, or chat system. Thus, the invention described herein is an improvement in the operation of a computer (or computers in a network).

Using the software-level information flow policies described herein, information received from an information source designated as private/confidential/secret or any information indirectly derived from such information cannot be allowed to be passed onto an information destination designated as public/open/lower secrecy level. There is an exception for when the information passes through a well-defined clearance software module, which could be implementing, for instance, a scrubbing process removing particularly sensitive information or encrypting the information.

Figure 6:
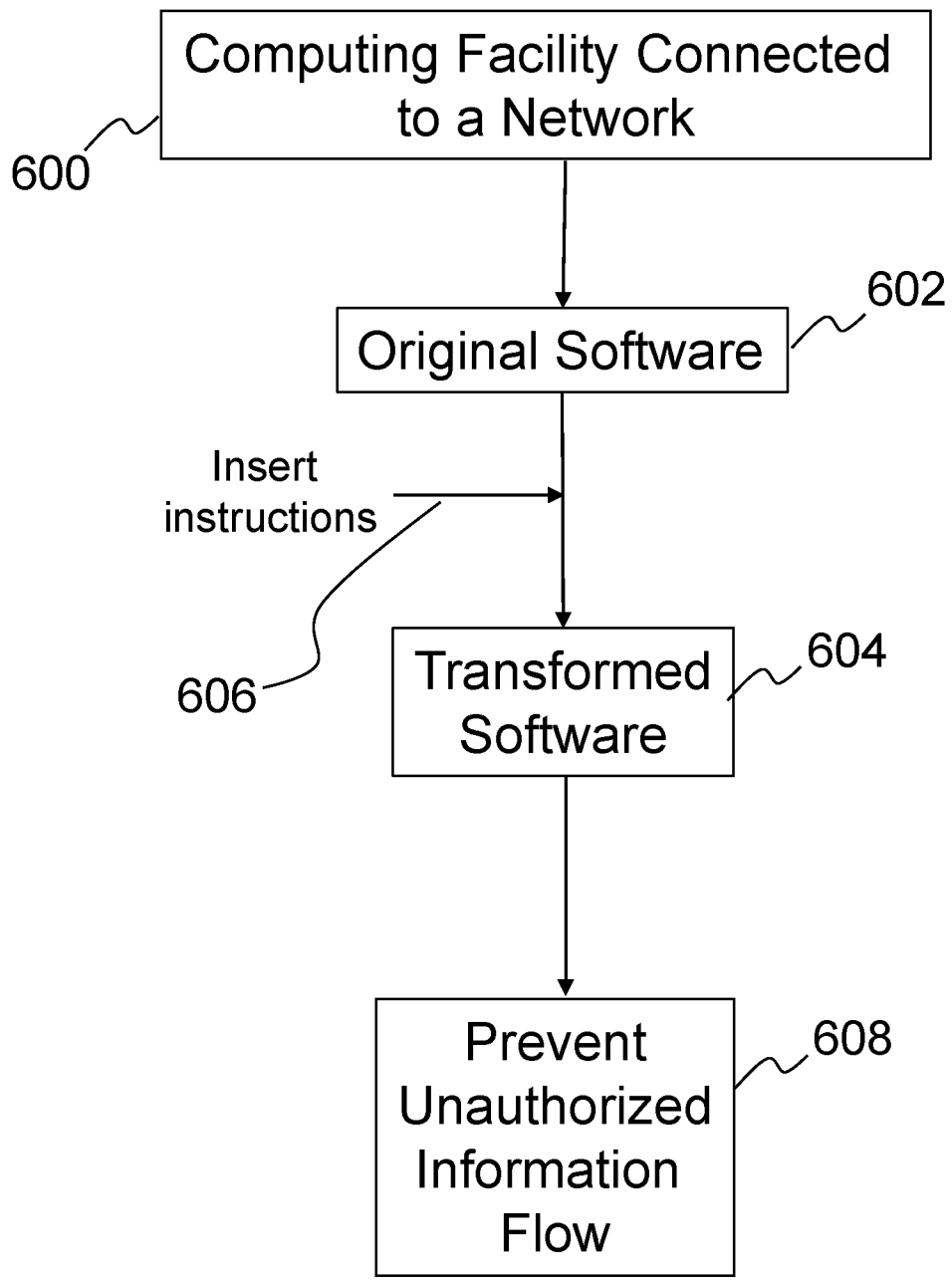
FIG. 6 is a flow diagram illustrating conversion of original software to transformed software according to embodiments of the present disclosure.

Additionally, the system according to embodiments of the present disclosure can prevent the flow of information from a network distinct from the network hosting the software of the invention to the network hosting the software contrary to a policy or rule. That is, the system prevents unauthorized information flow. In this case, the examples of clearance module functionality may include information validation, an authentication checker, and a digital signature checker. In this context, an "information source/destination" is a software interface communication with an entity external to that software (e.g., a particularly designated network connection, particularly designated storage device, or section of the storage device, another software component). FIG. 6 is a flow diagram illustrating steps of a software, where a computing facility connected to a network 600 hosts the software. The software converts an original software 602 to transformed software 604 via insertion of instructions 606, as described in detail above. The transformed software 604 can then act to prevent information flowing to a network (i.e., outside world) contrary to a policy or rule, or prevent unauthorized information flow 608 to the network.

The invention described herein guarantees that absolutely no information (even indirectly derived; this is what distinguishes "information" from just "data") can happen between a source and a sink, when the policy designates the sink as requiring the outgoing information to have higher integrity and/or lower confidentiality than the integrity/confidentiality designation that the policy assigns to the sink. The only exception being for the information that passed the policy-designated information validation/scrubbing/clearance module. The prevention means executing a policy-specified countermeasure against a software module that is about to violate the policy, the default countermeasure being simply stopping/aborting the executing of the offending software component (the checks are inlined, so basically "code; code; . . . ; pass data to information sink" becomes essentially "instrumented code; instrumented code; . . . ; if policy_violation(instrumented data, instrumented sink) abort ( ); pass data to information sink"; the point of "low overhead" in the title is that all this instrumentation does not slow things down by much).

One non-limiting example of a real-world situation for preventing unauthorized information flow using the invention according to embodiments of the present disclosure includes an infotainment software in a vehicle electronic control unit (ECU), which is prevented from passing to vehicle actuators (example of an information destination designated as requiring high integrity) an information that was changed due to a message received over the car infotainment WiFi connection (example of an information source designated as low integrity), unless the message has passed the validation that checked that the message was signed by a valid diagnostic software key (example of a policy designating a validation module).

Another example is medical software running on a health records server, which is prevented from passing any information from a health records database (example of information source designated as having high confidentiality) to a network connection (example of an information sink designated as requiring low confidentiality) unless the information is either encrypted using an encryption key corresponding to an authorized user, or unless the information being passed on have passed through an anonymizing statistics gathering module (an example of a policy designating two different clearance modules).

The effect of the invention described herein on enforcing the security policy may include compile-time (static) enforcement, where software that is discovered not to follow the policy would be flagged as non-compliant before it is allowed to execute. Furthermore, another effect is inlined run-time enforcement, where during the compile-time (statically, before it is ever executed), the software that is discovered to have a potential to violate the security policy would be augmented with inlined run-time checks ("inlined"—interspersed directly into software, "in between" the existing lines, not as a separate add-on). Then, during run-time, the checks would be performed and, if a situation arises where the original (unmodified) software would have violated the policy, the checks would prevent the violation (e.g., by terminating the execution of the instrumented software) before some information is released to an information destination that it is not supposed to be allowed to go to. The checks are inlined into the software itself and "low-overhead" means that instrumented software would not be significantly slower that unmodified software.

Figure 7:
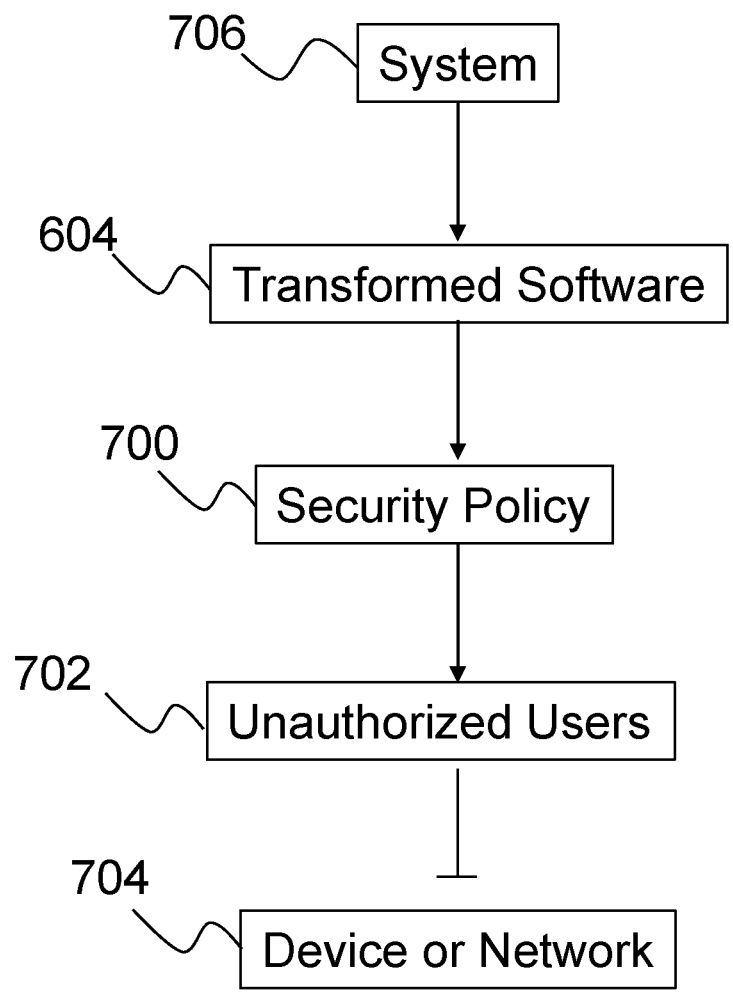
FIG. 7 is a flow diagram illustrating enforcement of security policies to prevent unauthorized access to a device or network according to embodiments of the present disclosure.

FIG. 7 is a flow diagram illustrating enforcement of security policies 700 to prevent unauthorized information flow (e.g., via unauthorized users 702) to a device or network 704. As described above, the system 706 described herein generates transformed software 604, which enforces the security policies 700. In one embodiment, the system 706 is a computing facility connected to a network, the computing facility hosting software. Non-limiting examples of devices and networks 704 that can be affected by enforcement of the security policies 700 include mobile devices, personal computers connected to a network, security key cards, door locks, and social media networks. For instance, the the transformed software 604 may enforce an information flow security policy 700 that prevents access of unauthorized users 702 of a mobile device (e.g., tablet, smartphone) or personal computer (e.g., laptop, desktop). Normal operations (e.g., powering on, accessing stored data) of a smartphone can be prevented so that unauthorized users 702 are unable to gain access to private user information. Additionally, the transformed software 604 can be used to enforce security policies 700 in social media user accounts (or other network user accounts) to prevent unauthorized access to private user information.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A computing facility connected to a network, the computing facility hosting software, the software comprising steps of:

transforming an original software by inserting additional instructions into the original software, resulting in transformed software;

based on the additional instructions, determining at run-time whether proceeding with execution of the original software is in accordance with an information flow security policy;

wherein transforming the original software relies on software analysis to determine whether any run-time checks normally inserted into the original software can be safely omitted; and preventing unauthorized information flow to the network using the transformed software.

2. The computing facility as set forth in claim 1, wherein the information flow security policy is formatted as a function summary, and wherein the function summary comprises equational propagation constraints and inequational enforcement constraints, wherein equational propagation constraints assign labels to outputs as a function of inputs, and inequational enforcement constraints specify upper bounds on function inputs.

3. The computing facility as set forth in claim 2, wherein in producing the function summary, the software further comprises steps of:

reducing the equational propagation constraints to two sets of level constraints comprising a set of ceilings and a set of floors;

processing the set of ceilings and the set of floors separately to simplify the equational propagation constraints; and merging the inequational enforcement constraints.

4. The computing facility as set forth in claim 2, wherein function summaries are merged for function pointers.

5. The computing facility as set forth in claim 1, wherein the software analysis comprises determining intervals to bound a possible run-time state.

6. The computing facility as set forth in claim 1, wherein the software analysis comprises determining intervals of possible security contexts of at least one of a program counter and program data at run-time.

7. The computing facility as set forth in claim 1, wherein a software that may violate the information flow security policy is augmented with inlined run-time checks.

8. The computing facility as set forth in claim 1, wherein the transformed software enforces an information flow security policy that prevents access to a mobile device for unauthorized users.

9. A computer program product for enforcing software policies, the computer program product comprising:

a non-transitory computer-readable medium having executable instructions encoded thereon, such that upon execution of the instructions by one or more processors, the one or more processors perform operations of:

transforming an original software by inserting additional instructions into the original software, resulting in transformed software;

based on the additional instructions, determining, at run-time, whether proceeding with execution of the original software is in accordance with an information flow security policy;

wherein transforming the original software relies on software analysis to determine whether any run-time checks normally inserted into the original software can be safely omitted; and preventing unauthorized information flow to the network using the transformed software.

10. The computer program product as set forth in claim 9, wherein the software analysis comprises determining intervals to bound a possible run-time state.

11. The computer program product as set forth in claim 9, wherein the software analysis comprises determining intervals of possible security contexts of at least one of a program counter and program data at run-time.

12. A computer implemented method for enforcing software policies, the method comprising an act of:

causing one or more processors to execute instructions encoded on a non-transitory computer-readable medium, such that upon execution, the one or more processors perform operations of:

transforming an original software by inserting additional instructions into the original software, resulting in transformed software;

based on the additional instructions, determining, at run-time, whether proceeding with execution of the original software is in accordance with an information flow security policy;

wherein transforming the original software relies on software analysis to determine whether any run-time checks normally inserted into the original software can be safely omitted; and preventing unauthorized information flow to the network using the transformed software.

13. The method as set forth in claim 12, wherein the information flow security policy is formatted as a function summary, and wherein the function summary comprises equational propagation constraints and inequational enforcement constraints, wherein equational propagation constraints assign labels to outputs as a function of inputs, and inequational enforcement constraints specify upper bounds on function inputs.

14. The method as set forth in claim 13, wherein in producing the function summary, the one or more processors further perform operations of:

reducing the equational propagation constraints to two sets of level constraints comprising a set of ceilings and a set of floors;

processing the set of ceilings and the set of floors separately to simplify the equational propagation constraints; and merging the inequational enforcement constraints.

15. The method as set forth in claim 12, wherein the software analysis comprises determining intervals to bound a possible run-time state.

16. The method as set forth in claim 12, wherein the software analysis comprises determining intervals of possible security contexts of at least one of a program counter and program data at run-time.

17. The computing facility as set forth in claim 1, wherein information flow policies are enforced utilizing a hybrid approach that combines a first static analysis pass and a second run-time monitoring pass.

18. The computing facility as set forth in claim 17, wherein the first static analysis pass is performed to discover definite information flow violations and flag potential information flow violations for the second run-time monitoring pass.

19. The computing facility as set forth in claim 17, wherein the second run-time monitoring pass modifies the original software by inlining a run-time monitoring component.

20. The computing facility as set forth in claim 17, wherein the second run-time monitoring pass inline monitors only information flows flagged as potential information flow violations by the first static analysis pass.

* * * * *